United States Patent [19]
Sato et al.

[11] Patent Number: 5,832,318
[45] Date of Patent: Nov. 3, 1998

[54] MOVABLE OPTICAL MEMBER CONTROL DEVICE IN OPTICAL APPARATUS HAVING A CONTROL MEANS AND A CONVERSION MEANS

[75] Inventors: Shigeki Sato; Masaharu Eguchi, both of Kanagawa-ken; Yoshihiko Konno, Tokyo, all of Japan

[73] Assignee: Canon Kabushiki Kaisha, Tokyo, Japan

[21] Appl. No.: 823,898

[22] Filed: Mar. 17, 1997

Related U.S. Application Data

[60] Continuation of Ser. No. 480,096, Jun. 7, 1995, abandoned, which is a division of Ser. No. 196,317, Feb. 14, 1994, Pat. No. 5,648,836.

[30] Foreign Application Priority Data

Feb. 18, 1993 [JP] Japan ..................................... 5-029010
Jul. 14, 1993 [JP] Japan ..................................... 5-196907

[51] Int. Cl.$^6$ ..................................................... G03B 13/34
[52] U.S. Cl. ............................ 396/86; 396/87; 396/131; 396/135; 348/345
[58] Field of Search .................................. 396/72, 79, 85, 396/86, 87, 131, 133, 135; 348/345

[56] References Cited

U.S. PATENT DOCUMENTS

| | | | |
|---|---|---|---|
| 4,972,215 | 11/1990 | Kitamura et al. | ...................... 354/195.1 |
| 5,422,694 | 6/1995 | Yoshida et al. | ........................... 354/106 |
| 5,450,161 | 9/1995 | Ichinose | ........................... 354/195.1 X |

*Primary Examiner*—Eddie C. Lee
*Assistant Examiner*—J. K. Han
*Attorney, Agent, or Firm*—Robin, Blecker & Daley

[57] ABSTRACT

A driving device includes a movable object, a driving part for moving the object, a manual operation member, a pulse generator for generating a plurality of pulses successively according to an operation of the operation member with pulse intervals varying depending on its operation speed, a data forming part for forming a plurality of data on the basis of the plurality of pulses successively according to the pulse intervals, a storage part for storing successively the plurality of data and a reading part for reading out the stored plurality of data successively and determining a drive parameter for each of the read out data corresponding to the speed for moving the object by the driving part by using the data value. The timing for reading out subsequent data is set after completion of the movement of the object on the basis of a prior data value.

23 Claims, 29 Drawing Sheets

FIG.5

| MODE | CONSTANT FOCAL LENGTH VARYING RATE MODE ||||||||| CONSTANT ANGLE-OF-VIEW VARYING RATE MODE |||||||||
|---|---|---|---|---|---|---|---|---|---|---|---|---|---|---|---|---|---|
| OBJECT DISTANCE | M.O.D. – 0.5m ||| 0.5m – 1.5m ||| 1.5m – ∞ ||| M.O.D. – 0.5m ||| 0.5m – 1.5m ||| 1.5m – ∞ |||
| OPERATING SPEED | LOW SPEED | NORMAL | HIGH SPEED | LOW SPEED | NORMAL | HIGH SPEED | LOW SPEED | NORMAL | HIGH SPEED | LOW SPEED | NORMAL | HIGH SPEED | LOW SPEED | NORMAL | HIGH SPEED | LOW SPEED | NORMAL | HIGH SPEED |
| RANGE OF FOCAL LENGTH (mm) | | | | | | | | | | | | | | | | | | |
| 28 – 34.5 | 4 | 10 | 20 | 3 | 8 | 15 | 2 | 5 | 10 | 4 | 8 | 12 | 3 | 6 | 9 | 2 | 4 | 8 |
| 34.5 – 41 | 4 | 10 | 20 | 3 | 8 | 15 | 2 | 5 | 10 | 5 | 10 | 15 | 4 | 7 | 12 | 3 | 5 | 10 |
| 41 – 47.5 | 4 | 10 | 20 | 3 | 8 | 15 | 2 | 5 | 10 | 7 | 14 | 21 | 5 | 10 | 15 | 3 | 7 | 13 |
| 47.5 – 54 | 4 | 10 | 20 | 4 | 10 | 20 | 2 | 5 | 10 | 9 | 18 | 27 | 7 | 13 | 21 | 4 | 9 | 17 |
| 54 – 60.5 | 5 | 13 | 25 | 4 | 11 | 22 | 2 | 5 | 10 | 12 | 24 | 36 | 9 | 18 | 27 | 5 | 11 | 21 |
| 60.5 – 67 | 6 | 15 | 30 | 5 | 13 | 25 | 2 | 5 | 10 | 16 | 31 | 47 | 11 | 22 | 35 | 6 | 13 | 26 |
| 67 – 73.5 | 8 | 20 | 40 | 5 | 13 | 25 | 2 | 5 | 10 | 20 | 39 | 59 | 14 | 30 | 44 | 7 | 15 | 30 |
| 73.5 – 80 | 12 | 30 | 60 | 7 | 15 | 30 | 2 | 5 | 10 | 27 | 54 | 81 | 18 | 38 | 55 | 8 | 18 | 36 |

FIG.9

| OBJECT DISTANCE | M.O.D.−0.5m | | | 0.5m−1.5m | | | 1.5m−∞ | | |
|---|---|---|---|---|---|---|---|---|---|
| OPERATING SPEED / RANGE OF FOCAL LENGTH (mm) | LOW SPEED | NORMAL | HIGH SPEED | LOW SPEED | NORMAL | HIGH SPEED | LOW SPEED | NORMAL | HIGH SPEED |
| 28 − 34.5 | 18 | 36 | 54 | 13 | 27 | 39 | 8 | 18 | 36 |
| 34.5 − 41 | 15 | 30 | 45 | 11 | 22 | 33 | 7 | 15 | 30 |
| 41 − 47.5 | 13 | 26 | 39 | 10 | 19 | 30 | 6 | 13 | 26 |
| 47.5 − 54 | 11 | 22 | 33 | 8 | 16 | 24 | 5 | 11 | 21 |
| 54 − 60.5 | 9 | 18 | 27 | 7 | 13 | 21 | 4 | 9 | 17 |
| 60.5 − 67 | 7 | 14 | 21 | 5 | 10 | 15 | 3 | 7 | 13 |
| 67 − 73.5 | 5 | 10 | 15 | 4 | 7 | 12 | 3 | 5 | 10 |
| 73.5 − 80 | 4 | 8 | 12 | 3 | 6 | 9 | 2 | 4 | 8 |

F I G. 14

| MODE | CONSTANT FOCAL LENGTH VARYING RATE MODE ||||||||| CONSTANT ANGLE-OF-VIEW VARYING RATE MODE |||||||||
|---|---|---|---|---|---|---|---|---|---|---|---|---|---|---|---|---|---|---|
| OBJECT DISTANCE | M.O.D.–0.5m ||| 0.5m–1.5m ||| 1.5m–∞ ||| M.O.D.–0.5m ||| 0.5m–1.5m ||| 1.5m–∞ |||
| OPERATING SPEED | LOW SPEED | NORMAL | HIGH SPEED | LOW SPEED | NORMAL | HIGH SPEED | LOW SPEED | NORMAL | HIGH SPEED | LOW SPEED | NORMAL | HIGH SPEED | LOW SPEED | NORMAL | HIGH SPEED | LOW SPEED | NORMAL | HIGH SPEED |
| RANGE OF FOCAL LENGTH (mm) | | | | | | | | | | | | | | | | | | |
| 28 – 34.5 | 3 | 7 | 13 | 2 | 5 | 10 | 1 | 3 | 7 | 3 | 5 | 10 | 2 | 4 | 6 | 1 | 3 | 5 |
| 34.5 – 41 | 3 | 7 | 13 | 2 | 5 | 10 | 1 | 3 | 7 | 4 | 7 | 10 | 3 | 5 | 8 | 2 | 4 | 7 |
| 41 – 47.5 | 3 | 7 | 13 | 2 | 5 | 10 | 1 | 3 | 7 | 5 | 9 | 14 | 4 | 7 | 10 | 2 | 5 | 9 |
| 47.5 – 54 | 3 | 7 | 13 | 3 | 5 | 13 | 1 | 3 | 7 | 6 | 12 | 18 | 5 | 9 | 14 | 3 | 6 | 11 |
| 54 – 60.5 | 4 | 9 | 17 | 3 | 7 | 15 | 1 | 3 | 7 | 8 | 16 | 24 | 6 | 12 | 18 | 4 | 7 | 14 |
| 60.5 – 67 | 4 | 10 | 20 | 3 | 7 | 15 | 1 | 3 | 7 | 11 | 21 | 31 | 7 | 15 | 23 | 4 | 9 | 17 |
| 67 – 73.5 | 5 | 13 | 27 | 4 | 9 | 17 | 1 | 3 | 7 | 13 | 26 | 39 | 9 | 20 | 29 | 5 | 10 | 20 |
| 73.5 – 80 | 8 | 20 | 40 | 5 | 10 | 20 | 1 | 3 | 7 | 18 | 36 | 54 | 12 | 25 | 37 | 5 | 12 | 24 |

MOVABLE OPTICAL MEMBER CONTROL DEVICE IN OPTICAL APPARATUS HAVING A CONTROL MEANS AND A CONVERSION MEANS

This is a continuation application under 37 CFR 1.62 of prior application Ser. No. 08/480,096, filed Jun. 7, 1995, now abandoned, which is a division of Ser. No. 08/196,317, filed Feb. 14, 1994, Pat. No. 5,648,836.

BACKGROUND OF THE INVENTION

1. Field of the Invention

This invention relates to a control device for controlling the action of a movable optical member in an optical apparatus.

2. Description of the Related Art

The power zoom lens barrels of conventional video cameras or the like have been arranged to vary a focal length by driving a zoom motor, according to an input signal from a zooming operation part, to rotate a cam ring or the like restricting the movement of a lens which is movable in the direction of an optical axis. The variations of the focal length have been dependent on the shape of a cam groove formed in the cam ring.

To solve this problem, it has been proposed to cause the focal length to vary at a constant rate relative to zooming time by rectilinearly forming the cam groove, for example, as disclosed in Japanese Patent Application Laid-Open No. SHO 63-167335.

It has also been proposed, as disclosed in Japanese Patent Application Laid-Open No. HEI 3-200127, to cause a driving voltage to increase on the side of wide-angle positions of a zoom lens and to decrease on the side of telephoto positions, according to the zoom position of the zoom lens. It has been further proposed, as disclosed in Japanese Patent Application Laid-Open No. HEI 1-161325, to vary the focusing lens driving speed according to the operating speed of operation means.

Further, it has been also proposed in Japanese Patent Application Laid-Open No. SHO 61-196214 to vary the rate of driving amount of a stepping motor used for driving the lens according to information on the aperture value and the focal length.

Meanwhile, various devices for detecting the rotation of a manual operation member which is to be rotatively operated and for driving an optical system with a motor have heretofore been proposed. These devices include the following:

A power focusing device disclosed in U.S. Pat. No. 4,864,344 is arranged to count a signal input to a manual operation member as pulses per rotation angle, to have an encoder at a motor provided for moving a focusing member of the optical system and to drive the motor as much as the amount of the above-stated count or in proportion to the amount of the count according to the output of the encoder of the motor.

A power focusing device disclosed in Japanese Patent Application Laid-Open No. HEI 1-161325 is arranged to detect the amount and speed of rotation of a manual operation member and to change the amount of driving a motor on the basis of the values thus detected.

A power focusing device disclosed in Japanese Patent Application Laid-Open No. HEI 1-182812 is arranged to detect the rotation speed of a manual operation member and to selectively set the high or low level of a motor driving output on the basis of the value detected.

Further, in a case where an input keyboard is used for a computer, a system contrived to prevent a process from being unable to follow an input from the keyboard is widely in use. For this purpose, the system is arranged to permit a prior input with data stored at a ring buffer by allowing an interruption when the keyboard is pressed.

The lens barrel of the kind having a cam groove formed in a cam tube in a rectilinear shape for the purpose of making the focal length varying rate constant, however, has presented the following problems: it is inferior in optical performance and also makes designing work more difficult than the conventional lens barrel of the kind having no limitation in the cam groove shape.

In the case of the proposed arrangement to vary driving control according to lens information, the control is arranged to be performed without taking the operating speed of the operation part into consideration. It, therefore, brings about a feeling of discrepancy between an operation intended by the photographer and an actual lens driving operation.

In the case of an ordinary zoom lens, on the other hand, the zooming operation feeling of the photographer varies according to the object distance as the focal length varies with the object distance.

Further, there has been disclosed no method of controlling lens positions using parameters other than the operating speed of the operation part, such as the amount of operation, the focal length and the object distance.

Further, in the case of the conventional device arranged to detect the rotation of the manual operation member to be rotatively operated and to drive the optical system with a motor, no heed is given to a time difference between the input timing of the manual operation member and the timing of completion of actual motor driving. As a result, there have been the following problems:

(i) When an instruction signal for a new action is inputted from the manual operation member before completion of a motor driving action in response to a previous instruction signal, a shift is made to a sequence of processes for the new action before completion of the previous action. The premature shift tends to cause an unstable operation.

(ii) With an instruction signal for a new action inputted from the manual operation member before completion of the motor driving action in response to the previous instruction signal, the premature shift to the sequence of processes for the new action also hinders an adequate operation pattern tracing action.

The ring buffer which is conventionally used for the keyboard of a computer is arranged to handle data which has established meaning at the time of input. However, no arrangement has been known for processing information of a time serial input such as the intervals of input from the manual operation member by storing it at the ring buffer. Besides, the ring buffer necessitates use of a plurality of keys in a case where it is desired to designate information of a plurality of kinds.

SUMMARY OF THE INVENTION

One aspect of this invention resides in the provision of an optical system including first detecting means for detecting at least an operating speed of an operation member, second detecting means for detecting a focal length, and driving means arranged to drive an optical member in response to an output of the first detecting means in a manner which varies according to changes in the focal length detected.

Another aspect of this invention resides in the provision of an optical system including first detecting means for detecting at least a moving amount of an operation member, second detecting means for detecting a distance to an object of shooting, and driving means arranged to drive an optical member in response to an output of the first detecting means in a manner which varies according to changes in the distance detected.

These and other aspects and features of this invention will become apparent from the following detailed description of embodiments thereof taken in connection with the accompanying drawings.

BRIEF DESCRIPTION OF THE DRAWINGS

FIG. 5 shows the numbers of pulses necessary in executing programs for zooming by the first embodiment.

FIG. 9 shows the numbers of pulses necessary in executing programs for focusing by the first embodiment.

FIG. 14 is a conversion table of driving amounts to be used by the third embodiment for normal rotation.

DETAILED DESCRIPTION OF THE PREFERRED EMBODIMENTS

Figure 1:
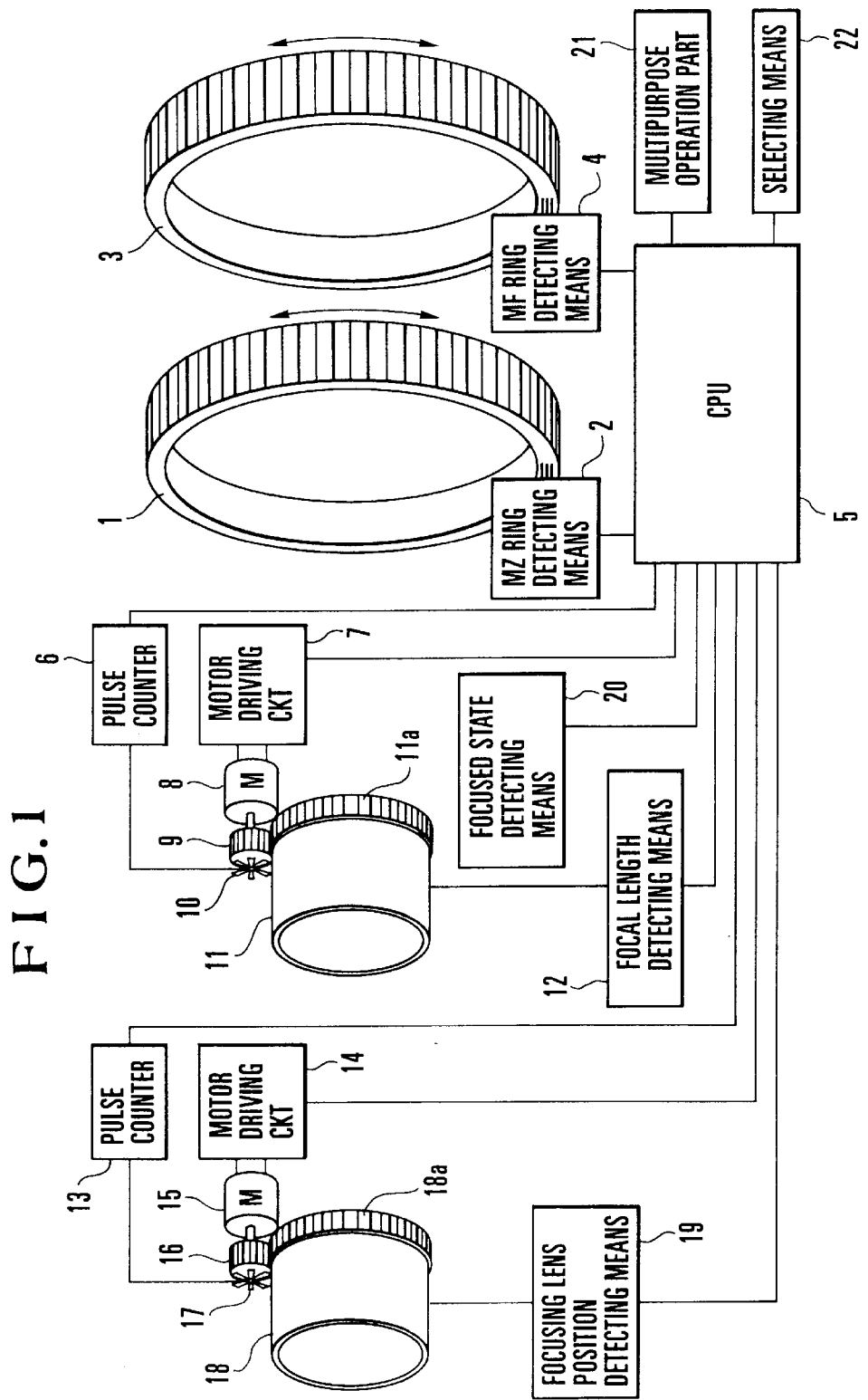
FIG. 1 is a block diagram showing in outline the arrangement of a first embodiment of this invention.

FIG. 1 shows the arrangement of an optical apparatus including a zoom lens barrel which is arranged as a first embodiment of this invention.

Referring to FIG. 1, a manual zoom ring 1 (hereinafter referred to as the MZ ring) is a rotary operation part which is provided for a zooming operation and is arranged to be endlessly rotatable. MZ ring detecting means 2 is arranged to detect the rotating direction, the operation amount (rotation angle) and the rotating speed of the MZ ring 1 and to transmit information on the results of detection to a CPU 5. A manual focusing ring 3 (hereinafter referred to as the MF ring) is provided for a focusing operation and is arranged to be endlessly rotatable in the same manner as the MZ ring 1. MF ring detecting means 4 detects the rotating direction, the operation amount (rotation angle) and the rotating speed of the MF ring 3 and transmits information on the results of detection to the CPU 5.

A zooming motor driving circuit 7 is arranged to drive a zooming motor 8 according to information received from the CPU 5. A gear 9 is mounted on the driving shaft of the zooming motor 8 and engages a gear part 11a which is provided in a part of a zoom cam ring 11.

Further, a pulse plate 10 is mounted also on the driving shaft of the zooming motor 8. A pulse counter 6 is arranged to detect the driving amount of the zooming motor 8 by counting the number of pulses of a pulse signal obtained from the pulse plate 10 and to transmit to the CPU 5 a signal indicating a driving amount thus detected.

A focusing motor driving circuit 14 is arranged to drive a focusing motor 15 according to information from the CPU 5. A gear 16 is mounted on the driving shaft of the focusing motor 15 and engages a gear part 18a which is provided in a part of a focusing cam ring 18.

The focusing motor 15 also has a pulse plate 17 mounted on its driving shaft in the same manner as the zooming motor 8. A pulse counter 13 is arranged to detect the driving amount of the focusing motor 14 by counting the number of pulses of a pulse signal obtained from the pulse plate 17 and to transmit to the CPU 5 a signal indicating a driving amount thus detected.

The cam rings 11 and 18 are arranged to vary respectively a focal length and an in-focus position by causing applicable lens groups to move back and forth in the direction of an optical axis with these cam rings 11 and 18 turned around the optical axis.

Focal length detecting means 12 is arranged to detect a current focal length by detecting the rotation angle of the cam ring 11. Focusing lens position detecting means 19 is arranged to detect the current position of a focusing lens through the rotation angle of the cam ring 18. This (first) embodiment is arranged to detect an object distance through a signal from the focusing lens position detecting means 19. Focused state detecting means 20 is arranged in a known manner to transmit a focused state signal to the CPU 5.

A multipurpose operation part 21 is arranged to permit a liking of the photographer to be reflected on the control. In other words, a driving amount is increasable or decreasable as much as a number of pulses corresponding to the amount of operation on this part 21. More specifically, a relation between the operation amount (rotation angle) of the MZ ring 1 and a change taking place in the focal length (see FIG. 5) can be adjusted as desired by the photographer. Selecting means 22 is arranged to permit selection of a driving mode as desired.

In the case of the optical system of this embodiment, the position of a focusing lens group and that of a zooming lens group are arranged to be controlled respectively by the different cam rings 8 and 11. Each of the MZ ring 1 and the MF ring 3 is provided with a pulse generating device. When the MZ ring 1 and the MF ring 3 are rotatively operated, pulses are generated by these devices. The amount of a zooming operation and that of a focusing operation are detected by counting the numbers of pulses thus generated with the MZ ring detecting means 2 and the MF ring detecting means 4. The rotating speeds of the MZ and MF rings 1 and 3 are detected by measuring the intervals of the pulses. Further, the lens optical system of this embodiment is a zoom lens having focal lengths ranging from 28 to 80 mm.

Figure 2:
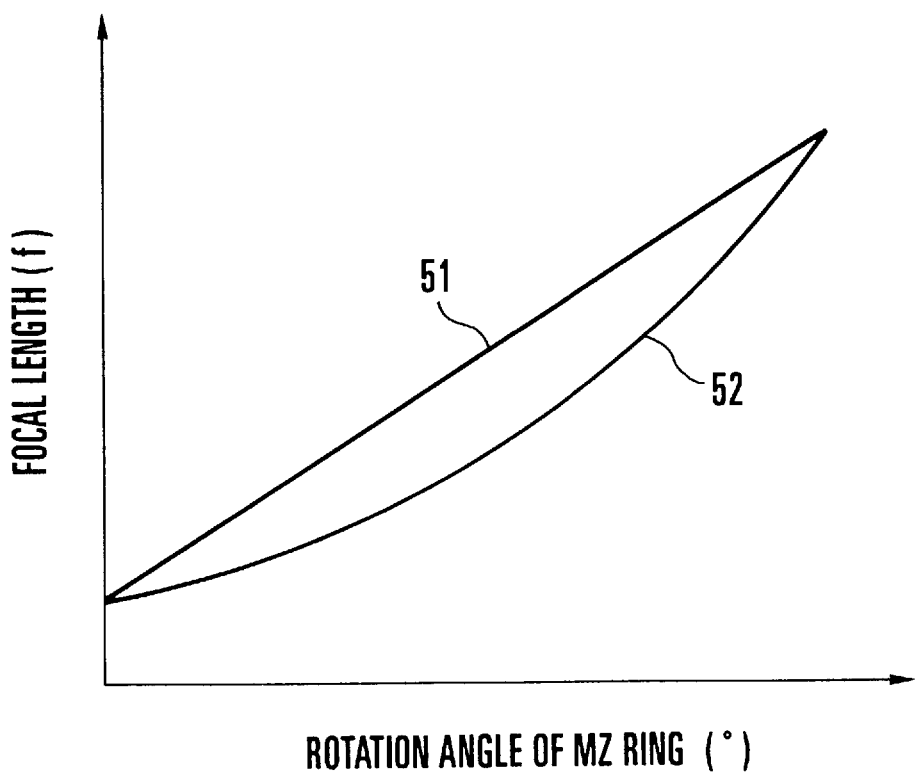
FIG. 2 is a graph showing fundamental programs for a zooming driving action of the first embodiment.

Next, lens position control relative to zooming is described as follows:

FIG. 2 simply shows the lens position control for zooming by program lines showing changes of the operation amount (rotation angle) of the MZ ring 1 and those of the focal length. A straight line 51 represents a constant focal length varying rate mode. In this mode, the operation amount (rotation angle) of the MZ ring 1 and the focal length change at constant rates.

A curve 52 represents a constant angle-of-view varying rate mode, in which the operation amount (rotation angle) of the MZ ring 1 and the angle of view change at constant rates.

Figure 3:
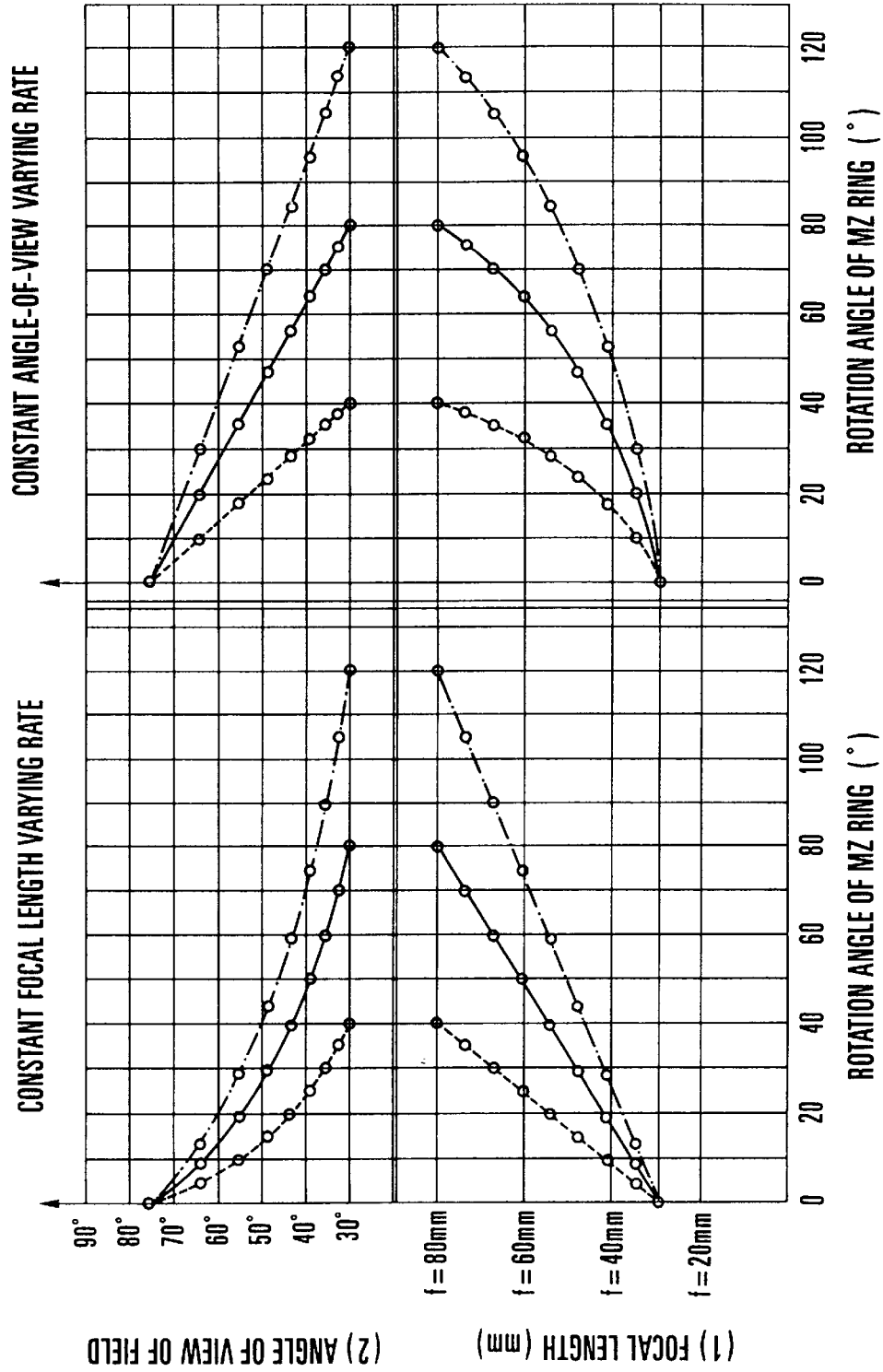
FIG. 3 shows the first embodiment in relation to the rotation angle of an MZ ring.

FIG. 3 shows, based on the relations represented by these lines 51 and 52 of FIG. 2, relations obtained among the operating speed of the MZ ring 1, the focal length and the angle of view.

The relations among the operation amount, or rotation angle, and the operating speed of the MZ ring, and the focal length and the angle of view of field shown in FIG. 3 are obtained with an object distance at an infinity distance. In FIG. 3, the axis of abscissa shows the operation amount (rotation angle) of the MZ ring 1. The axis of ordinate shows (1) the focal length and (2) the angle of view of field.

Point marks in FIG. 3 respectively indicate positions where the focal length is at 28 mm, 34.5 mm, 41 mm, 47.5 mm, 54 mm, 60.5 mm, 67 mm, 73.5 mm and 80 mm.

Among program lines (or curves) shown in the graph of FIG. 3, the program lines indicated by full lines represent normal programs. The program lines indicated by broken lines represent programs for a case where the MZ ring is quickly turned around (hereinafter will be referred to as at the time of a "high speed"). The program lines indicated by a one-dot-chain line represent programs for a case where the MZ ring is slowly turned around (hereinafter referred to as at the time of a "slow speed"). The CPU 5 is arranged to decide to have one of these programs automatically selected when the pulse intervals are not exceeding 5 msec at the time of high speed or 50 msec and above at the time of low speed. The length of time of the pulse interval which is used as the base of change-over of the speed varies with the lens and also with the diameter of the operation member or the total number of pulses per turn of the operation member.

In order to carry out control according to each of the program lines as shown in FIG. 3, this embodiment is arranged to detect (by pulses) the driving amount of the zooming motor 8 which drives according to the rotation of the MZ ring 1 and to vary the driving amount according to a focal length obtained at the start of driving caused by the operation of the MZ ring 1.

Figure 4:
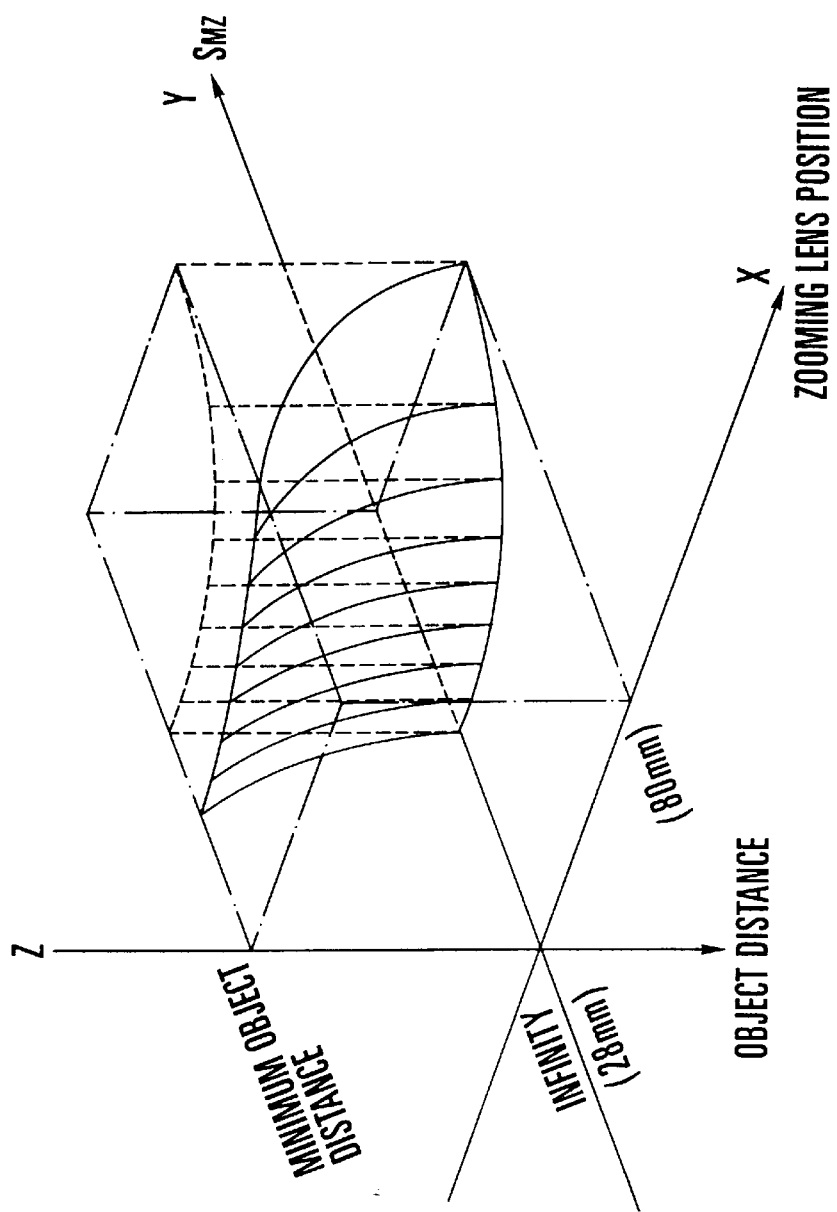
FIG. 4 shows a relation obtained among manual zoom sensitivity ($S_{MZ}$), a focal length and an object distance by the first embodiment.

Generally, a change in the object distance causes the focal length or the depth of field to vary. Therefore, the feeling of operation on operation means varies with the object distance. In the case of the lens of this embodiment, the driving amount is increased in the neighborhood of a minimum object distance, because the rate of change in focal length becomes more moderate accordingly as the lens position comes closer to the minimum object distance with the driving amount not changed. This relation is illustrated by FIG. 4 on the basis of the driving control in the constant angle-of-view varying rate mode shown in FIG. 3. With the driving control performed in this manner, the amount of change in focal length relative to the operation amount (rotation angle) of operation means is effectively controlled not to vary according to the object distance, etc.

In FIG. 4, an axis X shows the position of the zooming lens. An axis Y shows manual zoom sensitivity ($S_{MZ}$). The manual zoom sensitivity means the amount of change of the focal length which varies for the moving amount (operation amount) of the circumference of the MZ ring operation member. An axis Z shows object distances.

A curved face indicated by full lines in FIG. 4 is obtained when the driving amount is not varied according to the object distance. Another curved face which is indicated by broken lines represents a relation obtained when control is performed by driving amounts (numbers of driving pulses) shown in FIG. 5. In the case of this embodiment, the lens driving control is performed in such a way as to correct the curved face shown by full lines into the curved face shown by broken lines.

FIG. 5 shows the driving amounts of the zooming motor 8 by numbers of driving pulses to be used for each pulse of a pulse signal generated by the MZ ring 1. In a case where the object distance is an infinity distance with the embodiment in the constant angle-of-view varying rate mode, for example, the lens driving control is carried out as follows: while the focal length is within a range from 28 mm to 34.5 mm, the zooming motor 8 is driven, for each pulse generated by the MZ ring 1, by four driving pulses at the time of a normal speed, by eight driving pulses at the time of a high speed and by two driving pulses at the time of a low speed. Within another focal length range from 34.5 mm to 41 mm, the zooming motor 8 is driven by five pulses at time of the normal speed, by ten pulses at the time of the high speed and by three pulses at the time of the low speed. The driving control thus can be accomplished, in each of the different modes, by driving the zooming motor 8 to an extent which corresponds to an applicable number of driving pulses shown in FIG. 5.

Further, in the case of this embodiment, the cam ring 11 is arranged to have a cam shape which is formed in such a way as to have the rotation angle of the cam ring and the focal length respectively vary at constant rates. Therefore, in the constant focal length varying rate mode, the numbers of zooming motor driving pulses are not caused to vary by changes in focal length.

However, for a lens such as a high magnification lens or the like that is arranged to have no restrictions on the cam shape to allow designing and setting more latitude for a higher optical performance, the cam shape may be freely designed and the driving pulses may be changed according to the focal length in the above-stated constant focal length varying rate mode. In the other mode, therefore, a similar program of course also can be executed by adjusting the driving pulses of the mode shown in FIG. 3 using the amount by which the driving pulses are changed according to the focal length in the constant focal length varying rate mode.

Further, it is possible to adjust, by means of the multipurpose operation part 21, the values of a program table stored within the CPU 5 as desired by increasing or decreasing the number of pulses of all the driving amounts of the table according to the amount of operation. That is to say, the relation between the operation amount (rotation angle) of the MZ ring 1 and the change taking place in focal length can be adjusted as desired by the photographer.

Figure 6:
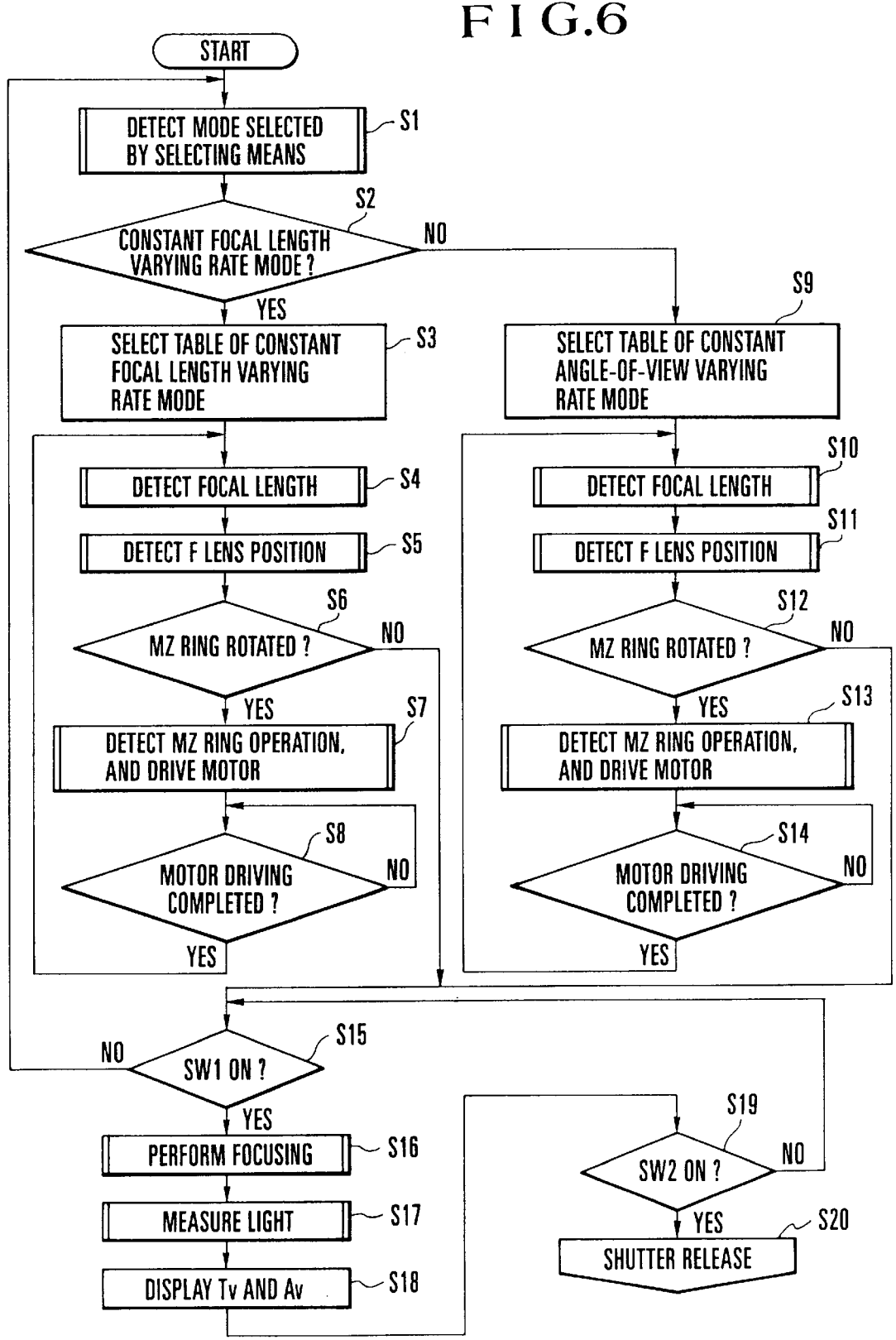
FIG. 6 is a flow chart showing a zooming action to be performed by the first embodiment.

Referring to FIG. 6, a series of actions to be performed by this embodiment with the power zoom lens barrel mounted on a camera is described as follows:

With the power zoom lens barrel mounted on the camera, a flow of control operation begins when the main switch of the camera is turned on. At a step S1, a mode selected by the selection means 22 is detected and the flow proceeds to a step S2. Before the selection means 22 is operated after the main switch is turned on, the embodiment is in a mode previously selected.

At the step S2, a check is made to find if the mode detected at the step S1 is the constant focal length varying rate mode. If so, the flow comes to a step S3. If not, the flow comes to a step S9.

At the step S3, a program table for the constant focal length varying rate mode is selected from among the programs stored within the CPU 5. The control is thus decided to be performed after the step S3 according to the program table selected.

At the step S9, a program table for the constant angle-of-view varying rate mode is selected from among the programs stored within the CPU 5. The control after the step S9 is thus decided to be performed according to the program table selected.

At a step S4 or S10, the focal length is detected by the focal length detecting means 12 according to the rotation angle of the cam ring 11. The flow then proceeds to a step S5 or S11. At the step S5 or S11, the position of the focusing lens is detected by the focusing lens position detecting means 19 and an applicable value is selected from the table. At a step S6 or S12, a check is made to find if the MZ ring 1 has been operated to rotate it. If so, the flow comes to a step S7 or S13. If not, the flow comes to a step S15.

At the step S7 or S13, the manual zoom (MZ) ring operating state, including the number of pulses generated by the rotation of the MZ ring 1, the operating direction (rotating direction) judged from the pulses and the pulse interval, is detected. The zooming motor 8 is then driven to an amount according to the relation shown in FIG. 5 on the basis of the focal length detected by the step S4 or S10 and the focusing lens position detected by the step S5 or S11. The flow then comes to a step S8 or S14.

At the step S8 or S14, a check is made to find if the zooming motor 8 which is driven by the step S7 or S13 has reached a predetermined driving amount shown in FIG. 5. If so, the zooming motor 8 is brought to a stop and the flow comes to the step S4 or S10.

The step S15 and steps subsequent to it are provided for control related to a shutter release of the camera which is to be made in a known manner.

At the step S15, a check is made to find if a shutter release button of the camera is pushed halfway to turn a switch SW1 on. If so, the flow comes to a step S16. If not, the flow comes back to the step S1.

At the step S16, a focus detecting action is performed in a known manner and a focusing action is performed according to the result of detection by driving the motor 15 for focusing on an object of shooting. At a step S17, a light measuring action is performed in a known manner. Optimum shutter-speed and aperture values are computed on the basis of information obtained by the steps S4 or S10 and S16. The flow then comes to a step S18. At the step S18, the shutter speed value Tv and the aperture value Av obtained by the step S17 are displayed by the display means of the camera. At a step S19, a check is made to find if the shutter release button has been pushed fully to turn a switch SW2 on. If so, the flow comes to a step S20 to make a shutter release in a known manner. If not, the flow comes to the step S15.

As described above, the embodiment is provided with a plurality of programs for varying the focal length in relation to the zooming operation. The photographer is allowed to select one of the programs according to a picture desired to be taken, so that the zooming operation can be carried out appositely to the desired picture.

In taking a shot of a landscape, for example, a desired area has a greater importance in the landscape. In this case, therefore, the shot is preferably taken in the constant angle-of-view varying rate mode as it better suited for the camera operation. If it is desired to quickly change the angle of view, the program is automatically shifted to high speed driving by quickly turning the MZ operation part, so that a time lag can be minimized to give a less disagreeable operation feeling to the photographer. Further, in normal shooting, any adverse effect of the cam shape can be avoided by selecting the constant focal length varying rate mode.

Further, in the case of this embodiment, the focal length is divided into eight focal lengths, the rotating speed of the MZ ring 1 is divided into three speeds and the object distance (i.e., the position of the focusing lens) is divided into three. In each of the tables, programs are changed by varying the driving pulses according to these divisions. However, the control of course can be accomplished in the same manner by changing this arrangement to replace the programs with computing formulas. It is possible to change the amounts of driving the zooming motor 8 to completely different values by increasing the numbers of divisions of the focal length and the object distance or according to the focal length obtained at the commencement of the operation.

In the case of this embodiment, the programs shown in FIGS. 2, 3 and 4 are arranged to be executed by varying the number of driving pulses. However, the control can be carried out in the same manner by using lens driving voltage values as the values of the table.

Figure 11:
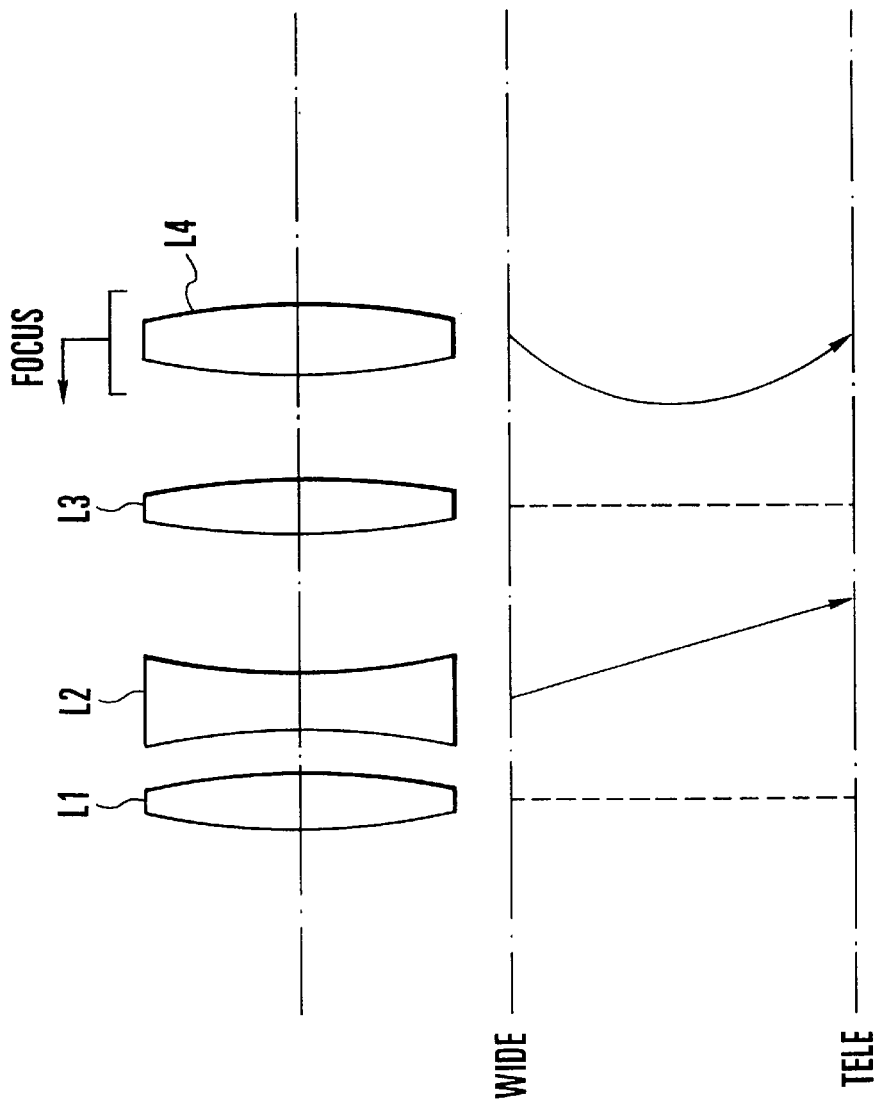
FIG. 11 shows in outline the arrangement of a zoom lens of a second embodiment of this invention.

The control also can be carried out in the same manner by another (or second) embodiment for a zoom lens of the kind having a focusing lens arranged to be moved by zooming as shown in FIG. 11. Referring to FIG. 11, the lens, in this case, includes a first lens group L1 and a third lens group L3 which are fixed. The zoom lens is arranged to perform zooming with a second lens group L2 and a fourth lens group L4 and to perform focusing with the fourth lens group L4.

Figure 12:
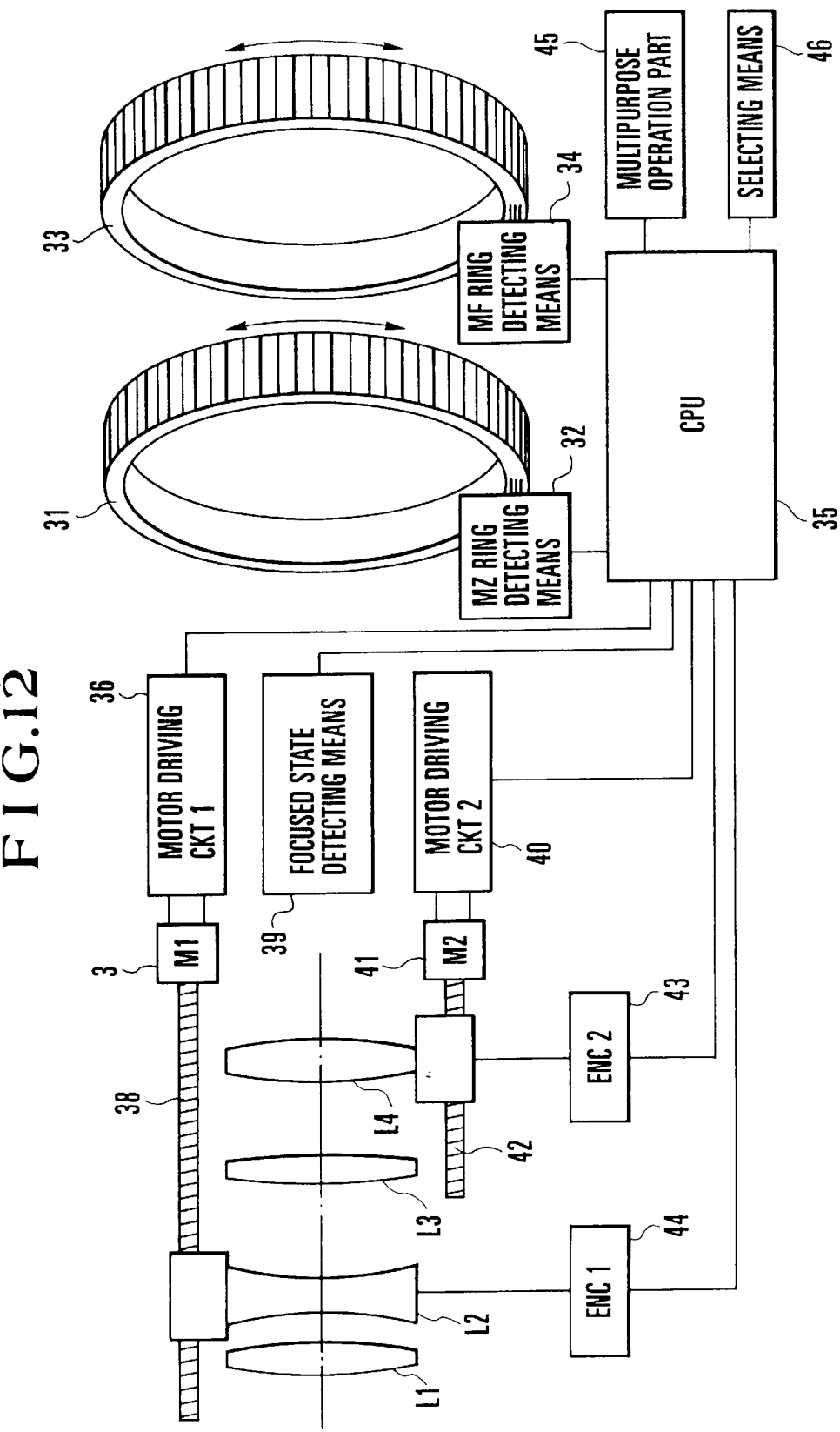
FIG. 12 is a block diagram showing in outline the arrangement of the second embodiment.

FIG. 12 shows the arrangement of an optical apparatus including the zoom lens of FIG. 11. In FIG. 12, reference symbols L1 to L4 respectively denotes the first to fourth lens groups. The illustration includes an MZ ring 31. MZ ring detecting means 32 is arranged to detect the operation amount (rotation angle), the operating speed, the operating direction, etc., of the MZ ring 31 and to transmit information on the results of detection to a CPU 35. An MF ring 33 is provided with MF ring detecting means 34 which is arranged, like the MZ ring detecting means 31, to detect the operation amount (rotation angle), the operating speed and the operating direction, etc., of the MF ring 33 and to transmit information on the results of detection to the CPU 35.

A motor 37 is arranged to move the second lens group L2 in the direction of an optical axis by rotating a rod 38 which is provided with a thread groove along its circumference. Further, the motor 37 is arranged to be driven by a motor driving circuit 36. Another motor 41 is arranged, similar to the motor 37, to move the fourth lens group L4 in the direction of the optical axis by rotating a rod 42 and to be driven by a motor driving circuit 40. Focused state detecting means 39 is arranged to detect the focused state of the lens.

An encoder 44 is arranged to detect the position of the second lens group L2. A focal length is computed from the output of this encoder 44. Another encoder 43 is arranged to detect the position of the fourth lens group L4. Therefore, an object distance, i.e., an amount of moving the lens by a focusing action, can be obtained from the information outputs of the encoders 44 and 43 by carrying out computation with the CPU 35.

A multipurpose operation part 45 is arranged to permit the photographer to adjust control as desired. More specifically, the driving amount can be increased or decreased by a number of pulses corresponding to an extent to which this operation part 45 is operated. That is to say, a relation between the operation amount of the MZ ring 31 and changes taking place in focal length can be adjusted to the liking of the photographer. Selecting means 46 is arranged to permit the photographer to select one of different driving modes as desired.

With the embodiment arranged in this manner, the zoom lens of the kind having the focusing lens arranged to be moved for compensation by zooming can be controlled in the same manner as in the case of the lens of the different kind shown in FIG. 1.

Further, an optical apparatus of a varifocal lens having its in-focus position variable by zooming may be also arranged to be controlled on the basis of a signal from focused state detecting means instead of detecting the object distance by the position of the focusing lens, etc.

Next, the lens position control to be performed for focusing by the first embodiment is described below:

Like in the case of zooming, focusing control is also variable by using parameters of varied kinds.

Figure 7:
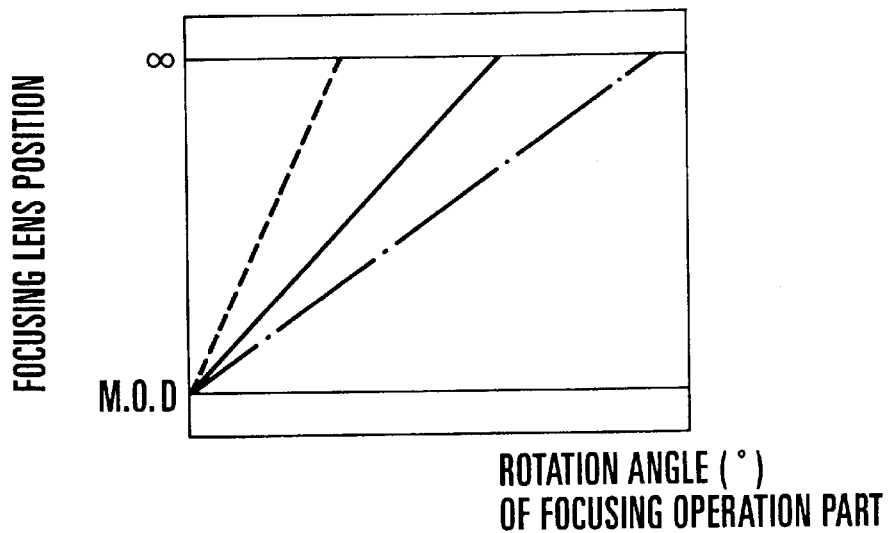
FIG. 7 shows a relation obtained in driving a focusing lens by the first embodiment.

FIG. 7 shows a relation among the operation amount (rotation angle) of the MF ring 3, the position of the focusing lens and the operating speed. The operation amount (rotation angle) of the MF ring 3 is shown on the axis of abscissa while the position of the focusing lens is shown on the axis of ordinate. In the case of this embodiment, a driving action is performed in such a way as to have the operation amount (rotation angle) of the MF ring 3 in a proportional relation to the position of the focusing lens (an object distance).

In the graph of FIG. 7, a program line shown by a full line represents a normal program. A program line shown by a broken line represents a program for a case where the MF ring 3 is quickly turned round (hereinafter referred to as the high speed). A program line shown by a one-dot-chain line represents a program for a case where the MF ring 3 is slowly turned round (hereinafter referred to as the low speed). The CPU 5 is arranged to automatically decide any pulse intervals that do not exceed 5 msec to be the high speed and any pulse intervals that are 50 msec and above to be the low speed.

Figure 8:
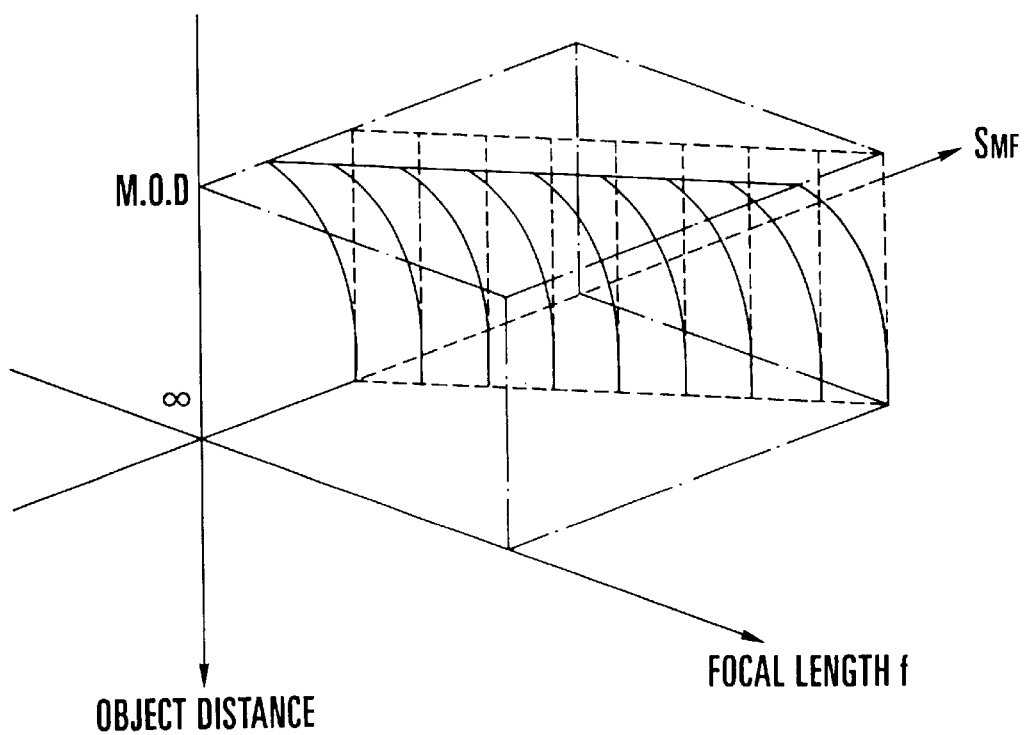
FIG. 8 shows a relation obtained among manual focusing sensitivity ($S_{MF}$), the focal length and the object distance by the first embodiment.

FIG. 8 shows a relation obtained by adding the object distance (the position of the focusing lens) to the above-stated relation. In FIG. 8, a curved face shown by full lines represents the driving characteristic of a state obtained without making any correction by the object distance. A flat face shown by broken lines represents a state obtained by putting in a necessary correction according to the object distance.

Generally, the value of focusing sensitivity ($S_{MF}$) becomes lower accordingly as the object distance comes nearer to a miminum object distance. The sensitivity to the focusing operation thus varies with the object distance to give a disagreeable operation feeling. In view of this, the embodiment is arranged to apply a correction in such a way as to make the curved face shown by full lines into the flat face shown by broken lines as shown in FIG. 8. The term "focusing sensitivity ($S_{MF}$)" as used herein means the amount of movement of an image plane which varies in relation to the amount of movement (operation amount) of the MF ring 3 along the circumference of the operation part.

FIG. 9 shows in a table the driving amount of the focusing motor necessary in carrying out the control of the above-stated relation. The driving amount is shown as the number of driving pulses per pulse of a pulse signal generated by the MF ring 3.

In the case of an infinity object distance, for example, while the focal length is within a range from 28 mm to 34.5 mm, the focusing lens is driven, for each pulse generated by the MF ring 3, as much as 18 driving pulses at the normal speed, as much as 36 pulses at the time of high speed and as much as 8 pulses at the time of the low speed. While the focal length is within a range from 34.5 mm to 41 mm, the focusing lens is driven as much as 15 pulses at the normal speed, as much as 30 pulses at the high speed and as much as 7 pulses at the low speed for each pulse generated by the MF ring 3. The driving control thus can be carried out by driving the focusing motor by as much as an applicable number of driving pulses in each of the modes shown in FIG. 9.

Figure 10:
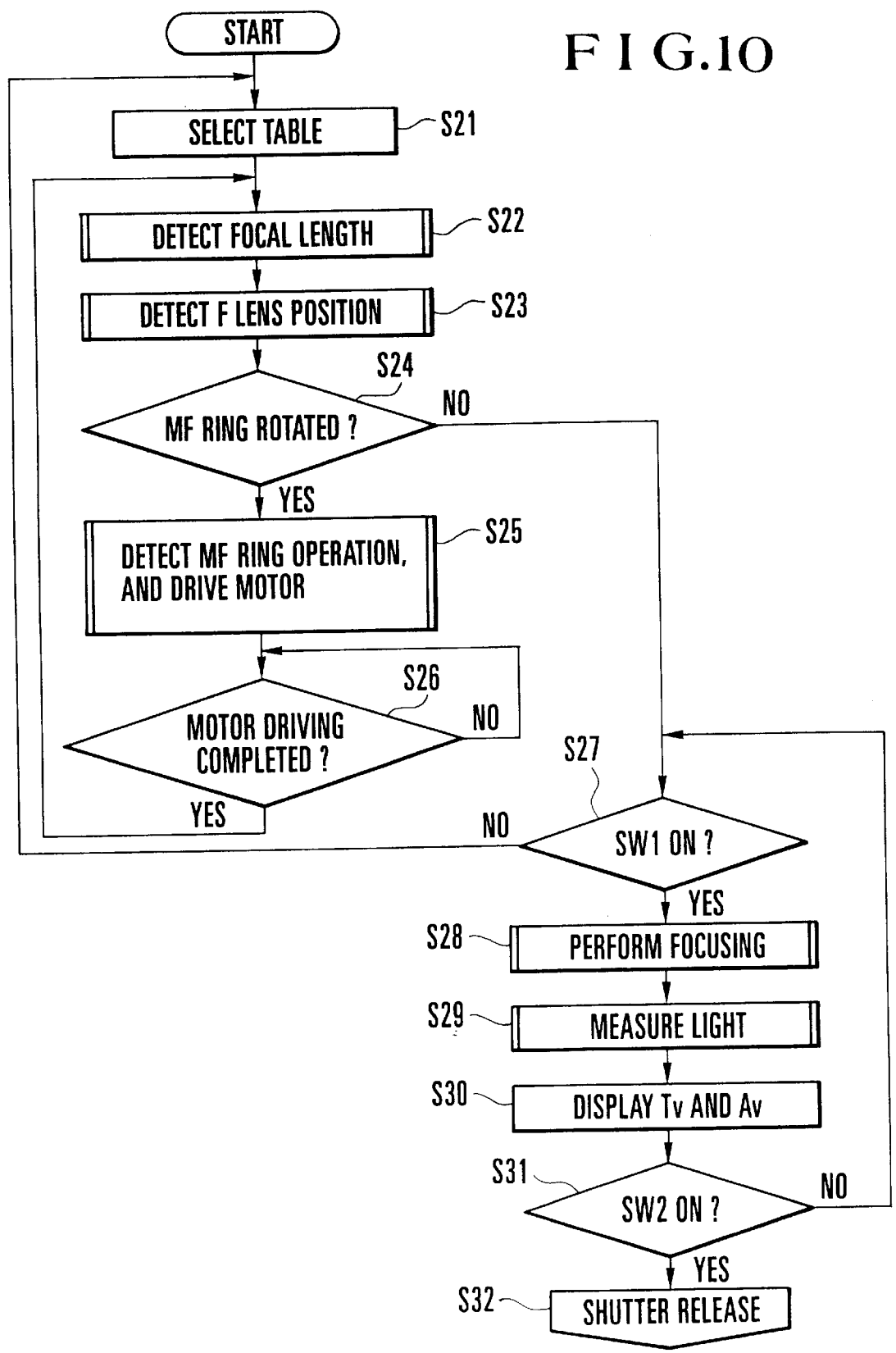
FIG. 10 is a flow chart showing a focusing action to be performed by the first embodiment.

A series of actions to be executed for focusing with the power zoom lens barrel of this embodiment mounted on a camera is described below with reference to FIG. 10:

When the main switch of the camera on which the power zoom lens barrel is mounted is turned on, a flow of operation begins as shown in FIG. 10. At a step S21, the focus driving table of a program stored within the CPU 5 is selected and, after that, the control is executed in accordance with this table.

At a step S22, the focal length is detected by the focal length detecting means 12 through the rotation angle of the cam ring 11. The flow then comes to a step S23. At the step S23, the position of the focusing lens is detected by the focusing lens position detecting means 19 through the rotation angle of the cam ring 18 and an applicable value is selected from the table. At a step S24, a check is made to find if the MF ring 3 has been operated to rotate it. If the MF ring 3 is found to have been rotated, the flow comes to a step S25. If not, the flow comes to a step S27.

At the step S25, a focusing ring operating state, including the number of pulses generated by the rotation of the MF ring 3, the direction of the operation (rotating direction) which is detectable by the pulses, the pulse interval, etc., is detected. The focusing motor 15 is driven to a driving amount according to the relation shown in FIG. 9 on the basis of the focal length detected by the step S22 and the focusing lens position detected by the step S23. The flow then comes to a step S26. At the step S26, a check is made to find if the focusing motor 15 which is driven by the step S25 has been driven to the driving amount as shown in FIG. 9. If the driving amount is found to have been reached, the focusing motor 15 is brought to a stop and the flow comes back to the step S22.

The step S27 and steps subsequent to it relate to a shutter release of the camera to be made in a known manner. At the step S27, a check is made to find if a shutter release button of the camera has been pushed halfway to turn a switch SW1 on. If so, the flow proceeds to a step S28. If not, the flow comes back to the step S21. At the step S28, a focus detecting action is performed in a known manner. A focusing action is then performed to focus the lens on an object of shooting by driving the motor 15 according to the result of detection.

At a step S29, a light measuring action is performed in a known manner. Optimum shutter-speed and aperture values are computed on the basis of information obtained by the steps S22, S23 and S28. The flow then comes to a step S30. At the step S30, the shutter-speed and aperture values Tv and Av computed by the step S29 are displayed by the display means of the camera.

At a step S31, a check is made to find if the shutter release button has been pushed to the full to turn a switch SW2 on. If so, the flow comes to a step S32 to make a shutter release in a known manner. If not, the flow comes back to the step S27.

In order that each of the programs shown in FIGS. 7, 8, 9 and 10 is carried out, this embodiment is arranged to drive the focusing motor 15 according to the rotation of the MF ring 3 and to vary the focusing motor driving amount (detected by pulses) according to a focal length obtained at the time of commencement of operation, the time of operation and the operating speed of the MF ring 3. The varying rate of the object distance which varies relative to the focusing operation is thus arranged to be variable and the control is performed according to shooting conditions desired by the photographer.

Further, the arrangement of having the program automatically shift to the high speed driving when the MF ring (operation part) is quickly turned around effectively minimizes a time lag, so that the operating feeling of the photographer can be made to be less disagreeable.

In the case of this embodiment, the focal length is divided and arranged in eight lengths, the MF ring rotating speed in three speeds and the object distance (focusing lens position) in three positions. The program is arranged to be varied by varying the number of driving pulses in each of the tables. However, the control of course can be accomplished in the same manner by replacing the program with a computing formula. The number of divisions of the focal length and that of the object distance may be increased. The focusing motor driving amounts also may be changed into entirely different values according to the focal length obtained at the time of commencement of the operation.

Further, the embodiment is arranged to execute the programs of FIGS. 7, 8, 9 and 10 by varying the number of driving pulses. However, the control can be likewise performed by changing this arrangement to have lens moving speed values, or lens driving voltage values, arranged in a table in place of the numbers of driving pulses.

Figure 13:
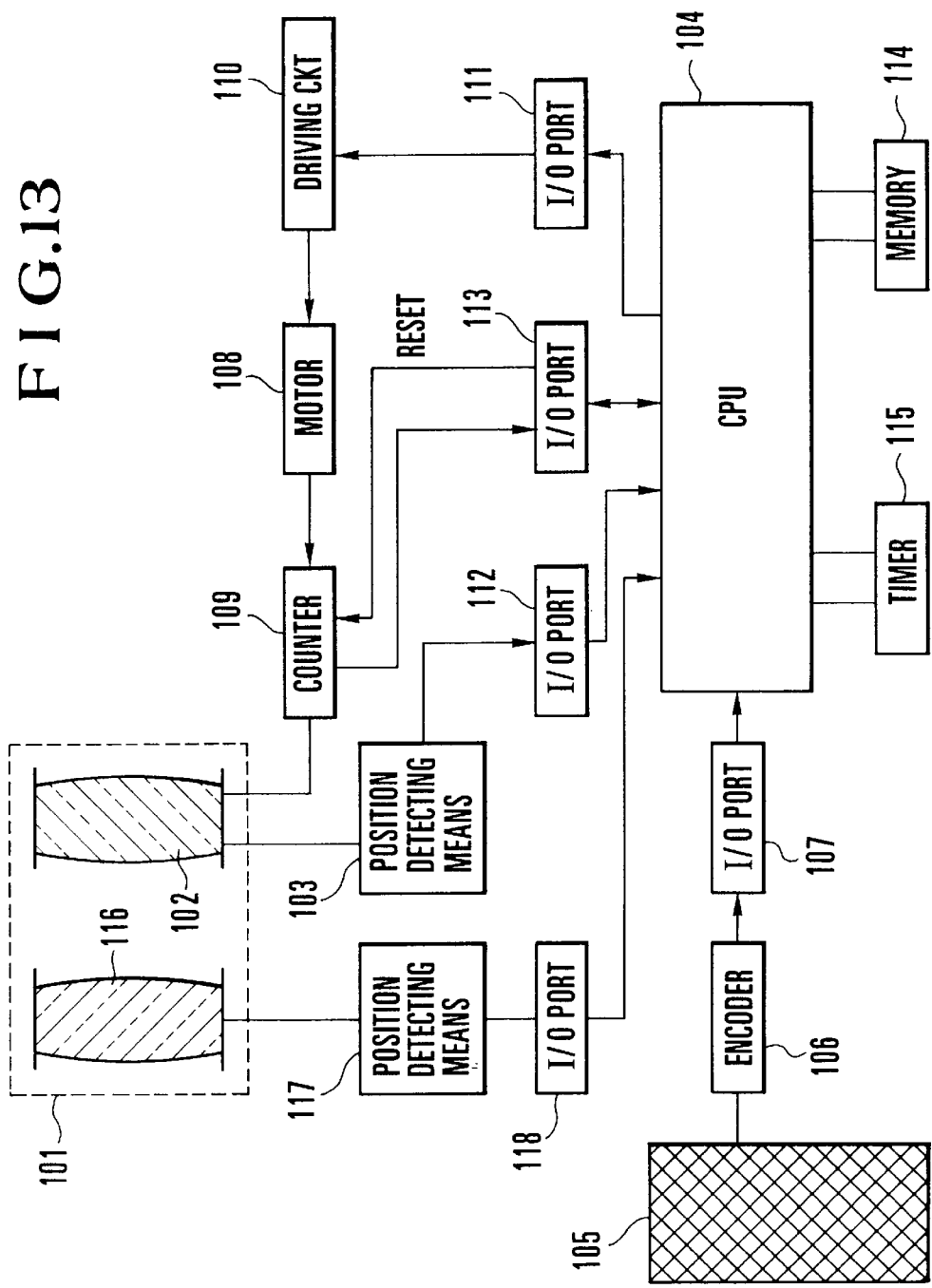
FIG. 13 is a block diagram showing in outline the arrangement of a third embodiment of this invention.

FIG. 13 is a block diagram showing a third embodiment of this invention. The third embodiment is arranged to perform control in a manner called "input history storing control". Further, in this case, the invention is applied to a power zoom lens of 28 to 80 mm.

Referring to FIG. 13, an optical system 101 includes a moving lens group 102. A (magnifying) power varying action is performed by moving the moving lens group 102 in the direction of an optical axis. Position detecting means 103 is connected to the moving lens group 102 and is provided for detecting the position of the moving lens group 102. A CPU 104 is included in a microcomputer which is arranged to control the whole lens. A manual operation member 105 is arranged to be rotatively operated by the photographer's hand. An encoder 106 is provided for detecting the rotation of the manual operation member 105. An I/O port 107 is provided for inputting a signal output of an encoder 106 to the CPU 104. The encoder 106 is arranged to detect the rotating direction and the rotation amount of the manual operation member 105 and to transmit information on the rotating direction and the rotation amount to the I/O port 107. A motor 108 is a drive source for driving the moving lens group 102. A counter 109 includes an encoder for detecting the rotation of the motor 108. A driving circuit 110 is arranged to drive the motor 108. An I/O port 111 is provided for connecting the CPU 104 to the driving circuit 110. An I/O port 112 is provided for inputting a signal output of the position detecting means 103 to the CPU 104. An I/O port 113 is provided for inputting a signal of the counter 109 to the CPU 104 and for sending a reset signal to the counter 109.

A memory 114 includes a ROM which is arranged to store a program for controlling the CPU 104 and a RAM in which work areas to be used for the program are set. The memory 114 is connected to the CPU 104. A timer 115 is provided for obtaining timing for various purposes.

A focusing lens group 116 is included in the optical system 101. A focusing action can be performed by moving the focusing lens group 116 back and forth in the direction of the optical axis. Position detecting means 117 is provided for detecting the position of the focusing lens group 116. An I/O port 118 is for inputting a signal output of the position detecting means 117 to the CPU 104.

Next, lens position control for zooming is described as follows: the lens position control for zooming is performed in the same manner as the control shown in FIG. 2. The operation amount (rotation angle) of the manual operation member 105 and the focal length are arranged to vary as indicated by the program lines shown in FIG. 2. In FIG. 2, the straight line 51 shows a constant focal length varying rate mode, in which the operation amount (rotation angle) of the manual operation member 105 and the focal length vary at constant rates. The curve 52 shows a constant angle-of-view varying rate mode, in which the operation amount (rotation angle) of the manual operation member 105 and the angle of view vary at constant rates. The operating speed of the manual operation member 105, the focal length and the angle of view are arranged, on the basis of the relation between the lines 51 and 52, to be in the same relation as in the case of the first embodiment as shown in FIG. 3.

FIG. 3 shows the relationship to be obtained, with the object distance at an infinity position, among the operation amount (rotation angle) of the manual operation member 105, the operating speed, the focal length and the angle of view of field. The axis of abscissa shows the operation amount (rotation angle) of the manual operation member 105. The axis of ordinate shows (1) the focal length and (2) the angle of view.

In FIG. 3, point marks respectively represent cases where the focal length is 28 mm, 34.5 mm, 41 mm, 47.5 mm, 54 mm, 60.5 mm, 67 mm, 73.5 mm and 80 mm. In the graph of FIG. 3, program lines indicated by full lines represent normal programs. Program lines indicated by broken lines represent programs to be used when the manual operation member 105 is quickly turned around (hereinafter referred to as at the high speed). Program lines indicated by one-dot-chain lines represent programs to be used when the manual operation member 105 is slowly turned around (hereinafter referred to as at the low speed).

In the case the zoom lens of this (third) embodiment, the focal length changes when the position of the focusing lens is changed by a change in the object distance. The changing amount of the focal length varies according to the lens position between a wide-angle end position and a telephoto end position. Hence, the feeling of a zooming operation would be caused to excessively vary by the change in the object distance if the change in the object distance is not taken into consideration.

The relations described above are consolidated in the same manner as in the case of the first embodiment as shown in FIG. 4. In FIG. 4, three axes respectively show the zooming lens position, the object distance and the sensitivity ($S_{Mz}$) of the manual operation member 105. The curved face shown by full lines in FIG. 4 represents a case where the driving amount is not changed according to the object distance. A curved face shown by broken lines represents a case where the control is performed by using driving amounts (numbers of driving pulses) which are arranged as shown in FIG. 14. This embodiment is arranged to be capable of correcting the curved face shown by the full lines into the curved face shown by broken lines.

Figure 15:
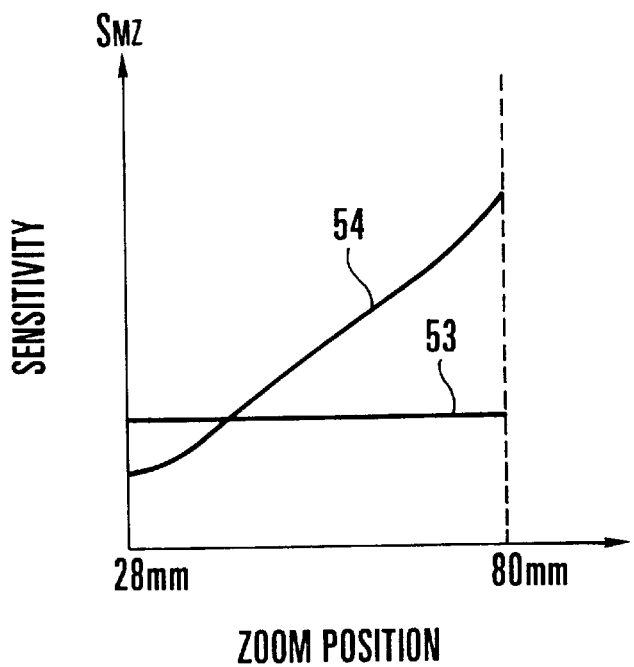
FIG. 15 is a graph showing operation sensitivity in relation to zoom positions obtained by the third embodiment in a constant angle-of-view varying rate mode and in a constant focal length varying rate mode.

FIG. 15 shows a relation between above-stated sensitivity value $S_{MZ}$ and the zoom position necessary in obtaining the program lines shown in FIG. 2. In FIG. 15, a line 53 shows values of the sensitivity $S_{MZ}$ obtained in the constant focal length varying rate mode and a line 54 a value of the sensitivity $S_{MZ}$ obtained in the constant angle-of-view varying rate mode.

As apparent from FIG. 15, the sensitivity $S_{MZ}$ varies in the constant focal length varying rate mode indicated by the line 54. This value is of course the intrinsic value of the lens system. It goes without saying that, depending on the lens arrangement, it is necessary to vary the value of sensitivity $S_{MZ}$ according to the zoom position even in the constant focal length varying rate mode.

Figure 16:
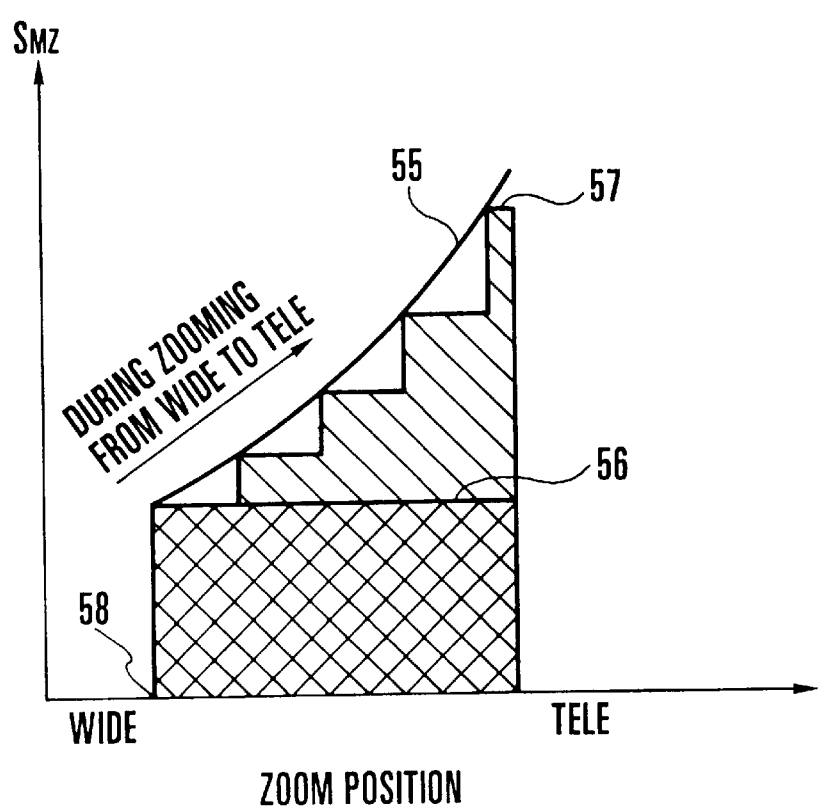
FIG. 16 is a graph showing ideal $S_{MZ}$ values obtained in process of zooming in the constant angle-of-view varying rate mode and obtained respectively under the control of the first and third embodiments.
Figure 17:
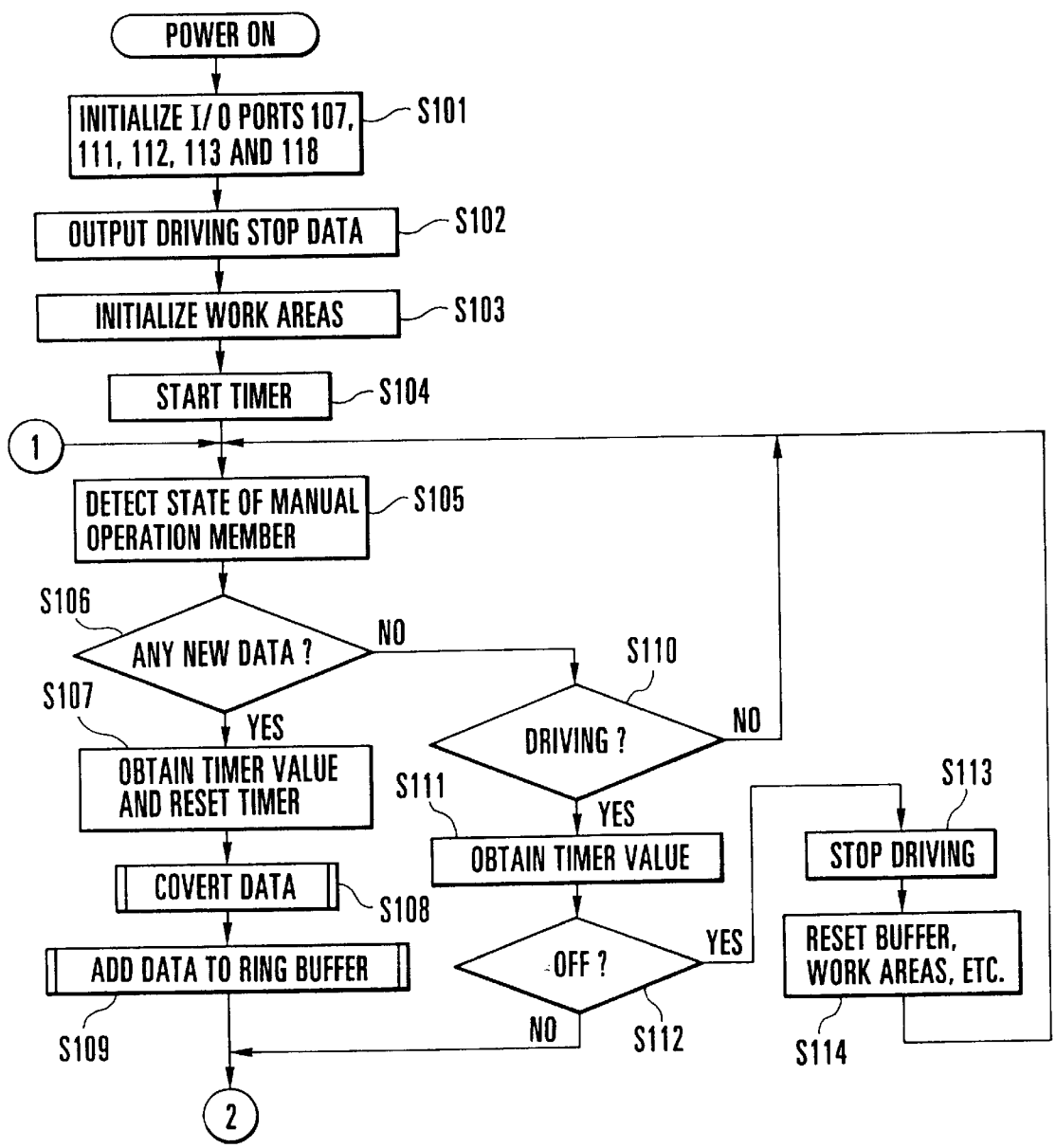
FIG. 17 is a flow chart showing the action of the control device of the third embodiment.
Figure 18:
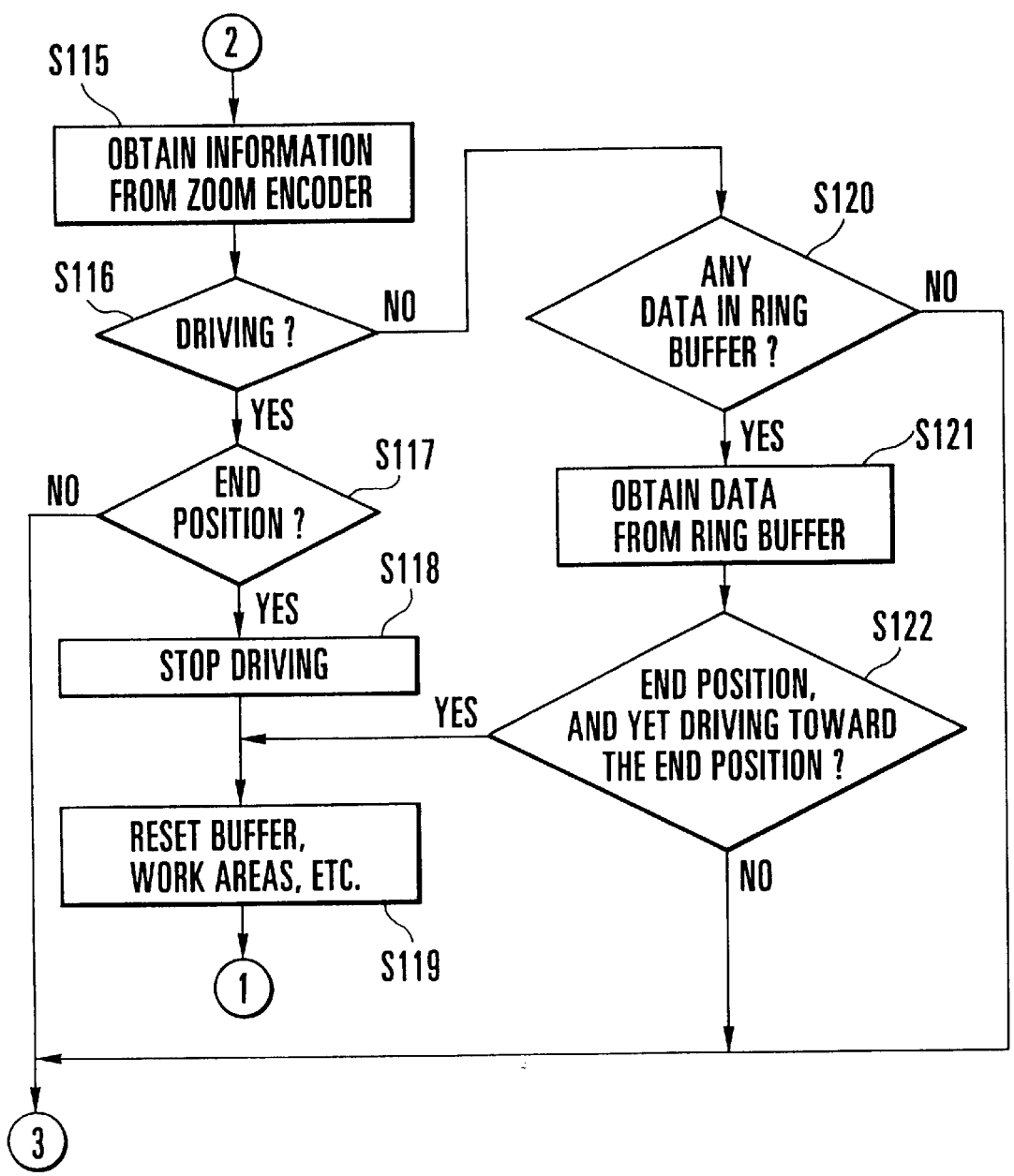
FIG. 18 is a flow chart showing the action of the control device of the third embodiment.
Figure 19:
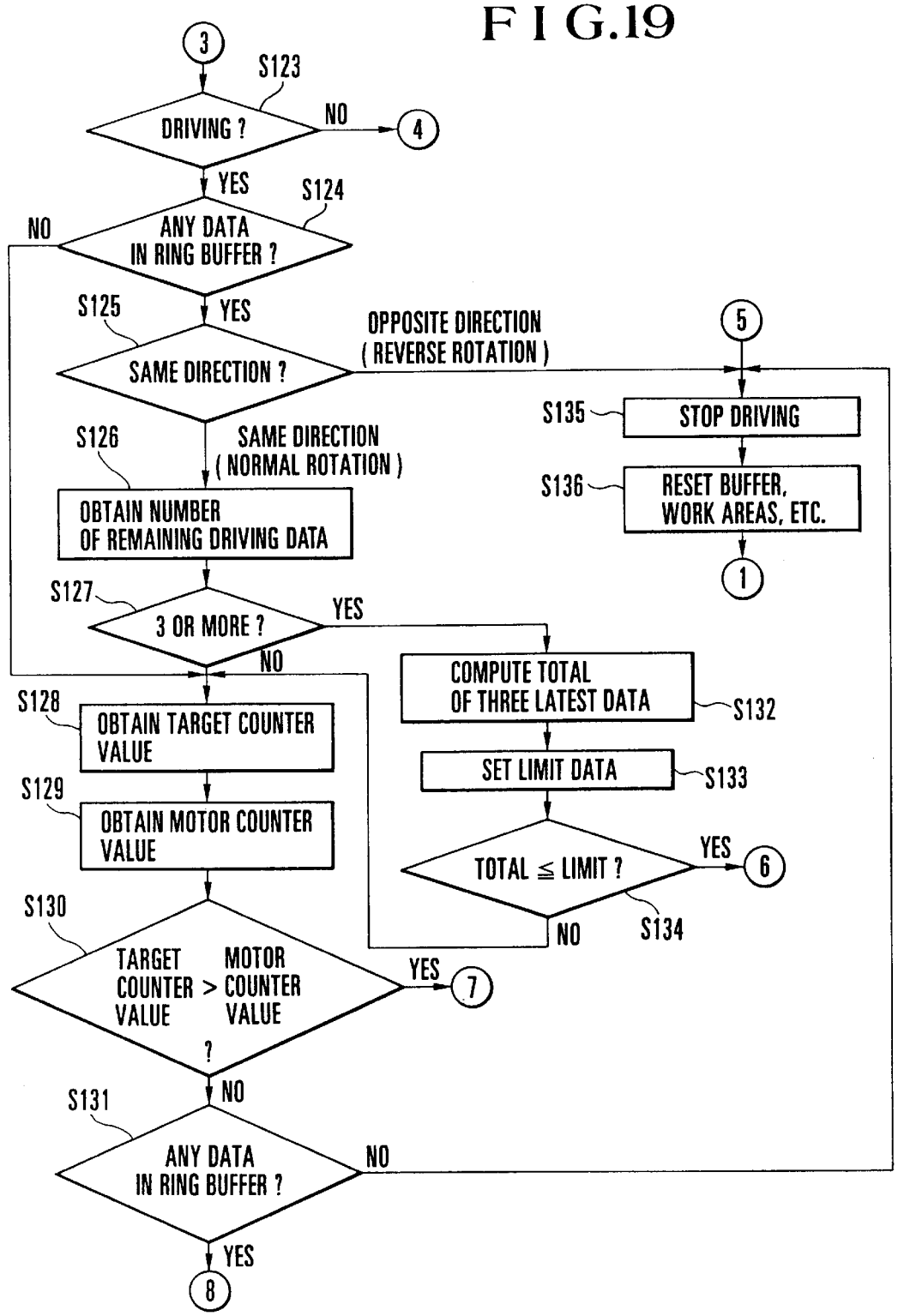
FIG. 19 is a flow chart showing the action of the control device of the third embodiment.
Figure 20:
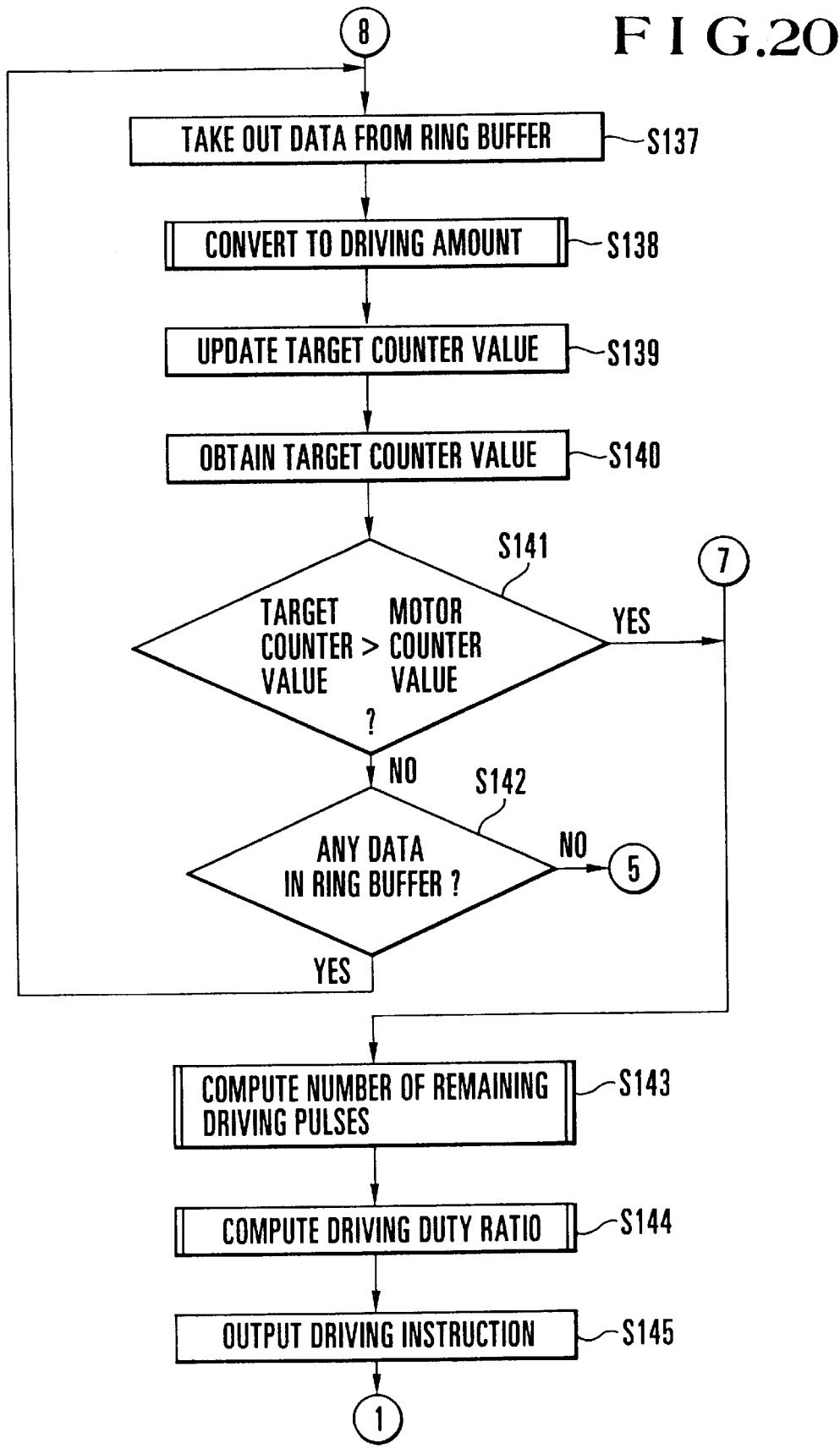
FIG. 20 is a flow chart also showing the action of the control device of the third embodiment.
Figure 21:
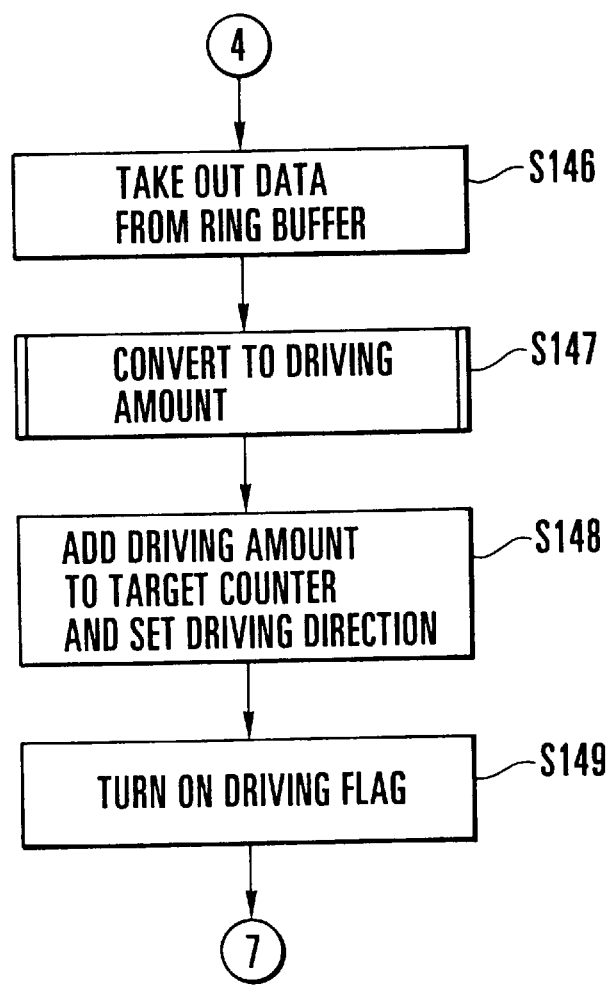
FIG. 21 is a flow chart further showing the action of the control device of the third embodiment.

FIG. 16 shows an action actually performed in the constant angle-of-view varying rate mode. A curve 55 shown in FIG. 16 represents a part of the $S_{MZ}$ line 54 shown in FIG. 15, which is an ideal control curve serving as a target of the control operation. In FIG. 16, a point 58 indicates timing at which the manual operation member 105 is operated. A plurality of data is taken in at this point of time 58. Further, the plurality of data taken in are time values showing the intervals of pulses. The operating speeds shown in FIG. 14 are determined according to these time values. The plurality of data thus respectively bears significance. FIG. 16 also shows the values of the sensitivity $S_{MZ}$ to be used when control is performed on the basis of the plurality of data taken in. In FIG. 16, a line 56 represents a sensitivity value $S_{MZ}$j actually used when the lens position control is performed by the embodiment shown in FIG. 1. A line 57 represents a sensitivity value $S_{MZ}$ r actually used for the input history storing control. In accordance with the method of the input history storing control, control can be reliably carried out along a set action program line, as indicated by the lines 56 and 57, even in a case where the actual driving point of time delays after the point of time when the manual operation member 105 is operated.

According to the conventional control, on the other hand, a desired value of sensitivity cannot be obtained at the actual driving point of time, because the value of sensitivity $S_{MZ}$ j is set at the point of time when the manual operation member 105 is operated.

Further, the operation feeling can be greatly improved with the operation sensitivity $S_{MZ}$ of the manual operation member changed from one value over to another according to the normal or reverse direction of operation. In view of this, the (third) embodiment is arranged to use the data of FIG. 14 for the normal rotation and the data of FIG. 5 for the reverse rotation.

The difference in control between the first and third embodiments is further described with reference to FIG. 28, which compares the movement of the zoom position of the lens system to be made according to the invented method of control with the movement of the zoom position to be made according to the conventional control method.

Figure 28:
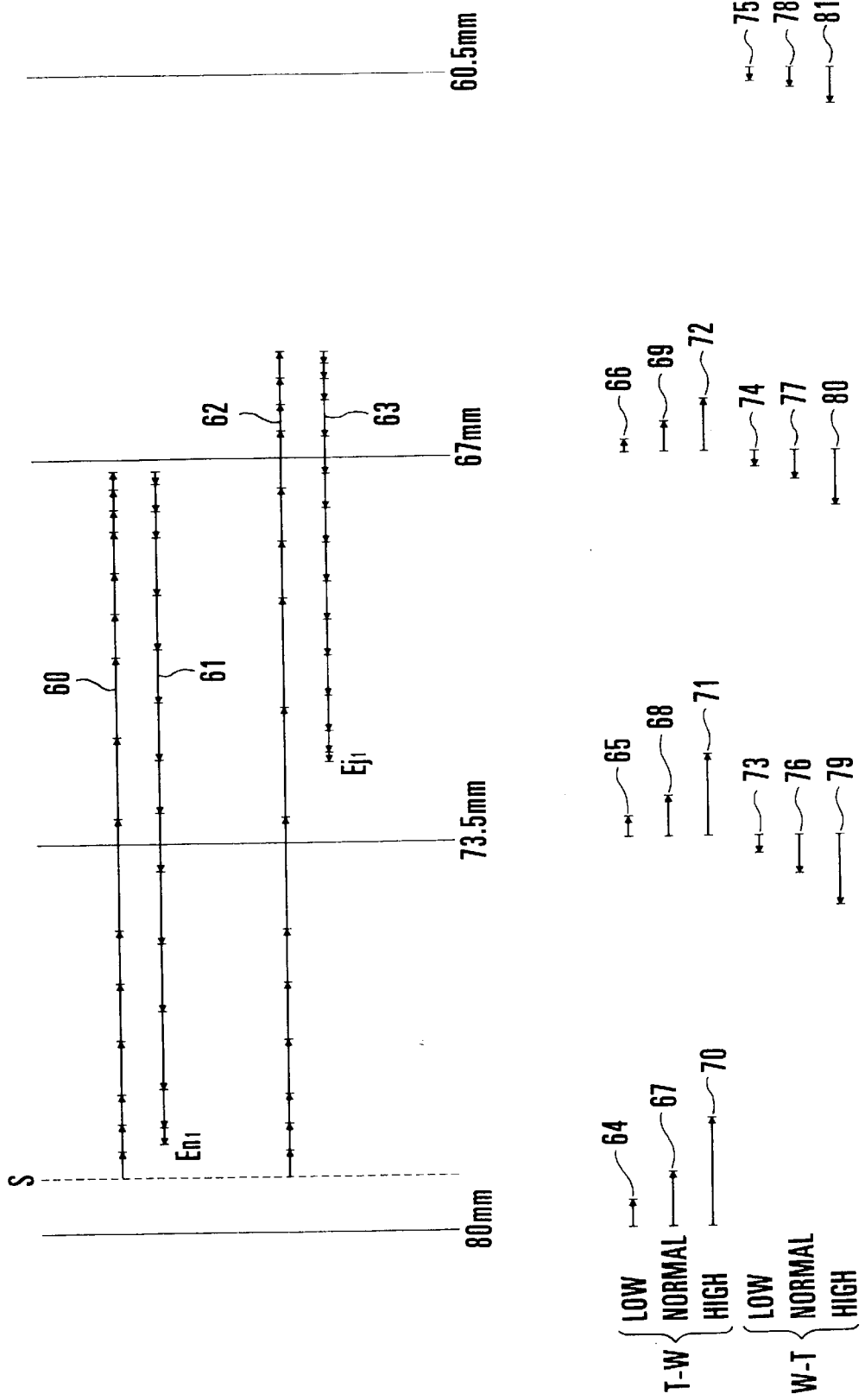
FIG. 28 shows the zooming behaviors of the third and first embodiments obtained in a case where driving amount sensitivity is changed according to driving by normal rotation or driving by reverse rotation.

In FIG. 28, a reference numeral 60 denotes a locus of movement of the zoom position obtained under the control according to this invention when the zooming operation ring is turned around from a telephoto position toward a wide-angle position. A numeral 61 denotes a locus of movement of the zoom position obtained when the zooming operation ring is operated, after the operation of it as shown by the locus 60, to turn it backward from the wide-angle position toward the telephoto position with the same feeling as the operation of the locus 60.

A numeral 62 denotes a locus of movement of the zoom position obtained when the zooming operation ring is turned around from a telephoto position toward a wide-angle position under the control of the conventional method with the same feeling as in the case of the locus 60. A numeral 63 denotes a locus of movement of the zoom position obtained when the zooming operation ring is operated, after the operation of it as shown by the locus 62, to turn it backward from the wide-angle position toward the telephoto position with the same feeling of operation as in the case of the locus 62.

Further, in FIG. 28, reference numerals 64 to 81 denote driving amounts which correspond to values shown in different positions in Table 1 below:

TABLE 1

| Direction | Operating speed | 80 mm–73.5 mm | 73.5 mm–67 mm | 67 mm–60.5 mm |
| --- | --- | --- | --- | --- |
| Reverse rotation | Low speed | 64 | 65 | 66 |
| | Normal speed | 67 | 68 | 69 |
| | High speed | 70 | 71 | 72 |
| Normal rotation | Low speed | 73 | 74 | 75 |
| | Normal speed | 76 | 77 | 78 |
| | High speed | 79 | 80 | 81 |

Assuming that the operating speeds of the manual operation member in the operation shown in FIG. 28 are expressed as L for the low speed, as M for the normal speed, and as H for the high speed, the operation in that case is performed in the following manner:

At the time of operation from a telephoto position to a wide-angle position: L L L M M M H H H M M M L L L At the time of operation from the wide-angle position to the telephoto position: L M M H H H H H H H H H M M L A difference between the normal rotation and the reverse rotation shown above is a phenomenon arising when the rotary manual operation member is manually operated.

Further, in FIG. 28, a symbol S denotes a position at which the zooming operation begins. A symbol En1 denotes the final position of the control performed by the third embodiment. A symbol Ej1 denotes the final position of the control performed by the first embodiment.

As apparent from comparison between the operation of loci 60 and 61 and the operation of loci 62 and 63, in the case of the control performed by the first embodiment, the final control position Ej1 comes to greatly deviate from the control start position S through the normal and reverse operations. The reason for this resides in the fact that, under the control of the first embodiment, the sensitivity of the driving amount relative to the operation of the manual operation ring is fixed at the time of input, and information obtained at the time of driving is not dynamically reflected on the driving.

Figure 29:
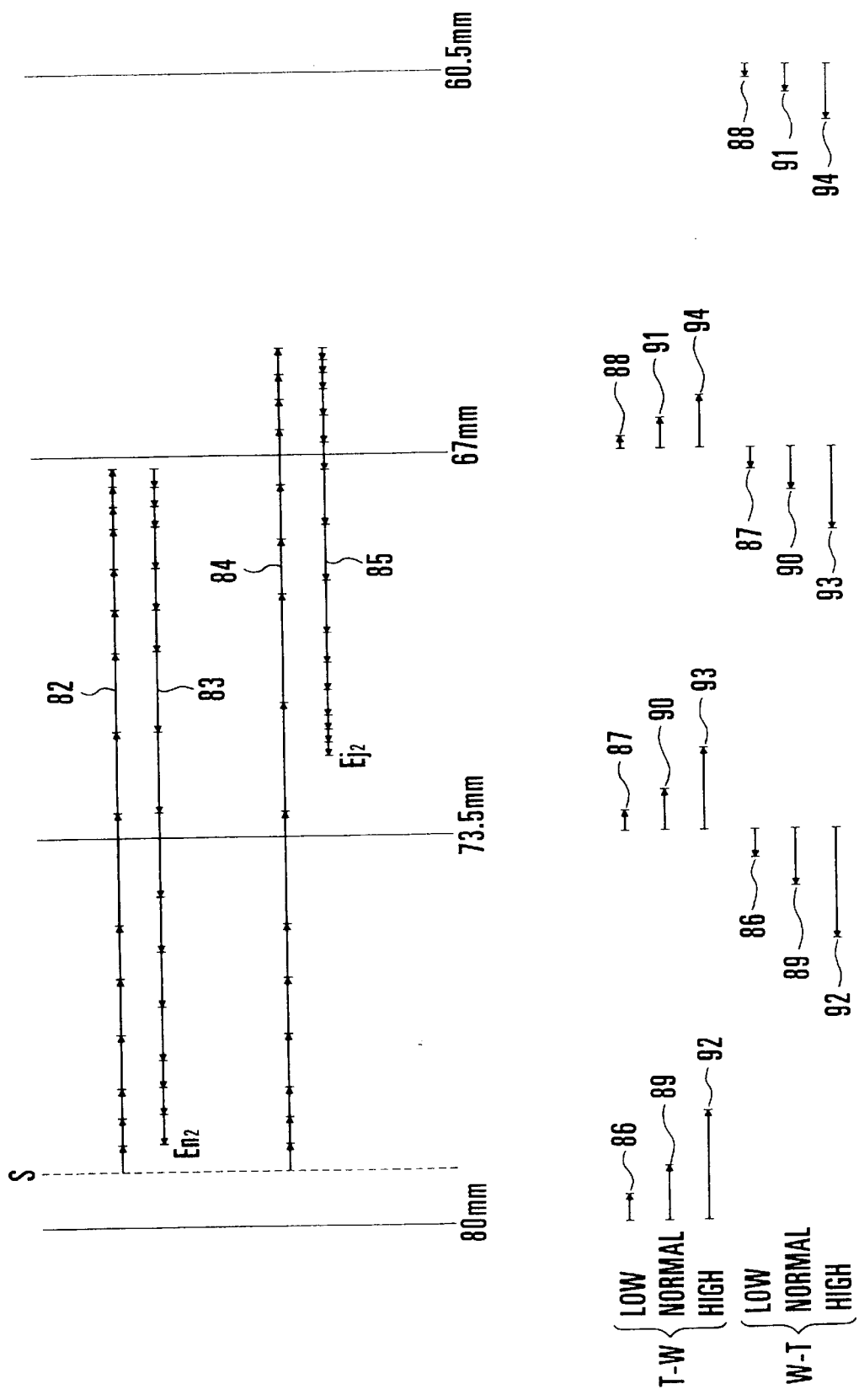
FIG. 29 shows the zooming behaviors of the third and first embodiments obtained with the driving amount sensitivity not changed according to driving by normal rotation or driving by reverse rotation.

FIG. 29 shows by way of example actions to be performed in a case where the driving amount sensitivity is preferably to be the same both for the normal rotation and the reverse rotation. In this case, one and the same value is used both for the driving amount sensitivity of the normal rotation and for that of the reverse rotation.

In FIG. 29, a reference numeral 82 denotes a locus of movement of the zoom position obtained under the control of this invention when the zooming operation ring is turned around from a telephoto position to a wide-angle position. A numeral 83 denotes a locus of movement of the zoom position obtained when the zooming operation ring is operated, in the same manner as the operation of the locus 82 after the end of it, to turn the ring around backward from the wide-angle position toward the telephoto position. A numeral 84 denotes a locus of movement of the zoom position obtained under the control of the conventional method when the zooming operation ring is turned around from a telephoto position to a wide-angle position. A numeral 85 denotes a locus of movement of the zoom position obtained when the zooming operation ring is operated in the same manner as the operation of the locus 84, after the end of it, to turn the ring backward from the wide-angle position toward the telephoto position.

Further, in FIG. 29, numerals 86 to 94 denote driving amounts which correspond to values shown in different positions in Table 2 below:

TABLE 2

| Direction | Operating speed | 80 mm–73.5 mm | 73.5 mm–67 mm | 67 mm–60.5 mm |
| --- | --- | --- | --- | --- |
| Normal and reverse rotation | Low speed | 86 | 87 | 88 |
| | Normal speed | 89 | 90 | 91 |
| | High speed | 92 | 93 | 94 |

Further, assuming that the operating speeds of the manual operation member operated as shown in FIG. 29 are expressed as L for the low speed, as M for the normal speed, and as H for the high speed, both the operation from the telephoto position to the wide-angle position and the operation from the wide-angle position back toward the telephoto position are performed in the following manner:

L L L M M M H H H M M M L L L

Further, in FIG. 29, a reference symbol S denotes a position at which the zooming operation begins, in the same manner as in FIG. 28. A symbol En2 denotes the final control position obtained with the control performed by the third embodiment. A symbol Ej2 denotes the final control position obtained with the control performed by the first embodiment. As apparent from comparison of the loci 82 and 83 with the loci 84 and 85, under the control of the first embodiment, the final control position Ej2 saliently deviates from the start position S through the normal and reverse rotations, like in the case of FIG. 28.

The problem of operations shown in FIGS. 28 and 29 results from the following: despite the change-over of the driving amount sensitivity of the manual operation ring according to the state of the lens system and the operating speed of the manual operation ring for the purpose of improving lens driving operability, the driving amount sensitivity of the manual operation ring itself is fixed at the point of time of input under the control of the conventional method. Therefore, information obtained at the point of time of driving cannot be dynamically reflected on the driving.

More specifically, in the case of the driving locus 62 of FIG. 28, even when the focal length is within the ranges from 73.5 mm to 67 mm and from 67 mm to 60.5 mm, the driving speeds of the motor corresponding to the speeds L, M and H are fixed at the values which are set at the start of driving for the focal length range from 80 mm to 73.5 mm (L=64, M=67 and H=70).

The third embodiment, on the other hand, is arranged to drive the motor at a driving speed set for each applicable range of focal lengths and to set the driving speed values for zooming from a telephoto position to a wide-angle position differently from the driving values set for zooming from a wide-angle position to a telephoto position.

Next, a program for carrying out the above-stated input history storing control is described. FIGS. 17 to 25 are flow charts showing a main program used for operating the microcomputer of this embodiment. FIG. 26 shows the arrangement of a ring buffer which is provided for storing a prior input.

The operation of this embodiment is described with reference to FIGS. 17 to 25 as follows: the flow of operation comes to a step S101 after a power supply is turned on. At the step S101, each of the I/O ports is initialized. The I/O ports 107, 112 and 118 are set as input ports. The I/O port 111 is set as an output port. The I/O port 113 is set as an input/output port.

At a step 102, an energizing stopping instruction is sent to the driving circuit 110 by outputting energizing stopping data to the I/O port 111. Further, a reset signal is sent from the I/O port 113 to the counter 109 to reset the counter 109. Upon receipt of the instruction, the driving circuit 110 stops applying a current to the motor to turn the motor 108 off.

At a step 103, the following are secured as work areas and initialized within the RAM of the memory 114:

- a "pointer-now" which is a pointer currently in use and indicates data stored in the ring buffer;
- a "pointer-new" which is a pointer for the latest data and indicates data stored in the ring buffer;
- a "ring-buf" which is used for a prior input and stores data indicating the intervals of a signal coming from the encoder 106;
- a "k-flag" which indicates that a driving action is in process and is arranged to be at "1" while the motor is in process of driving and at "0" while it is in repose;
- a "direction" which indicates the driving direction of the motor; and
- a "counter" which indicates a target counter value for driving.

At a step S104, the timer 115 is started after it is initialized. The value of the timer 115 is used as reference for measurement of the intervals of an input signal from the encoder 106. At steps S105 to S114, the input history of the operating speed of the manual operation member 105 is stored by analyzing data from the manual operation member 105 and by inputting the result of analysis to the ring buffer. The end of an operation on the manual operation member 105 is also monitored.

At the step S105, information from the encoder 106 is taken in through the I/O port 107. The state of the manual operation member 105 thus can be detected. At the step S106, a check is made to find if any new data has been inputted. If so, the flow of control comes to the step S107. If not, the flow shifts to the step S110. In other words, the flow proceeds to the step S107 if new pulses have been generated by the rotation of the manual operation member 105.

At the step S107, the current value of the timer 115 is obtained from the timer 115. After that, the timer 115 is reset to make it ready for a next round of measuring the input signal intervals. The rotation speed of the manual operation member 105 thus can be detected.

Figure 23:
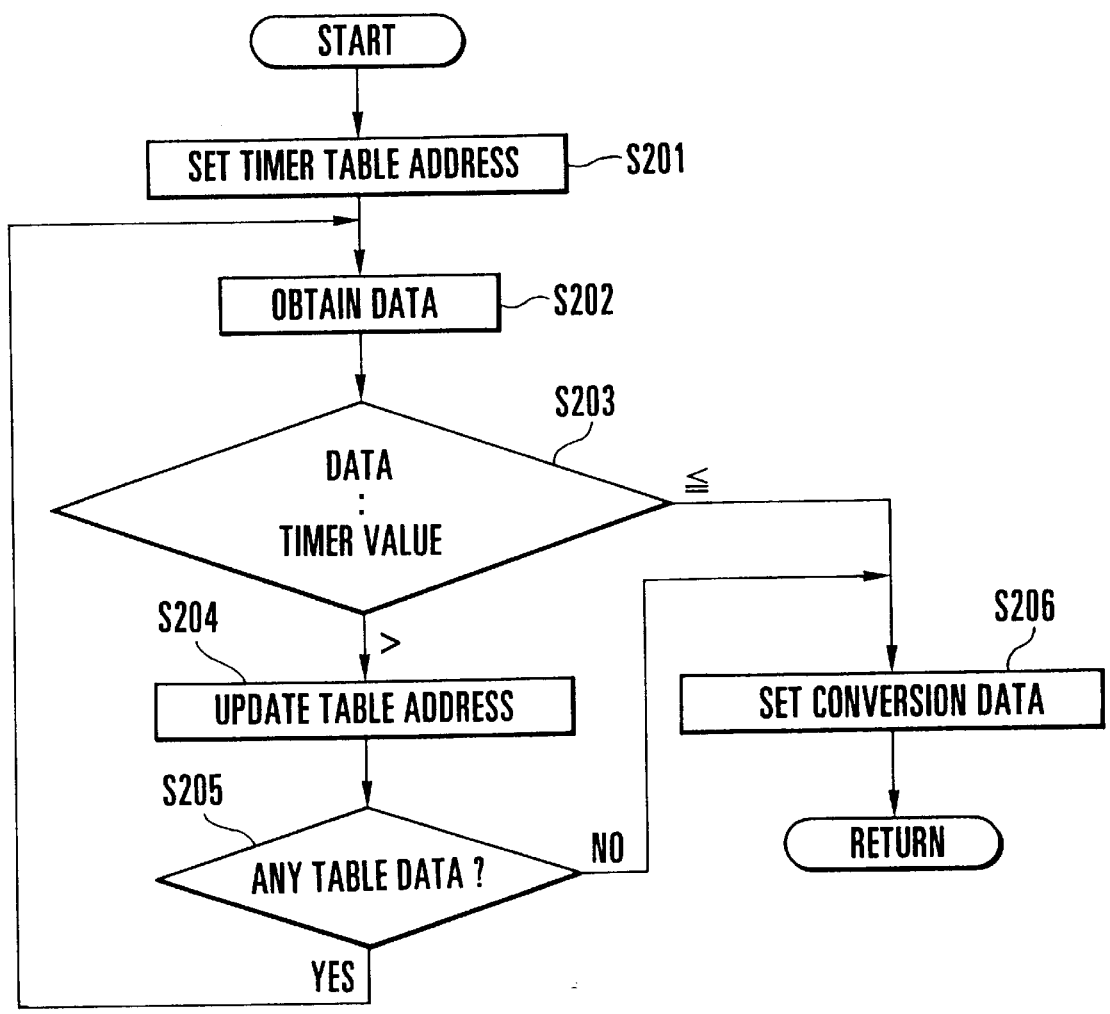
FIG. 23 is a flow chart further showing the action of the control device of the third embodiment.

At the step S108, the timer value obtained by the step S107 is converted into data for storing in the ring buffer. This routine is arranged to be a subroutine, which begins at a step S201 as shown in FIG. 23. The subroutine shown in FIG. 23 is executed to use the timer value as an input parameter and to send back the data to be stored in the ring buffer as output parameter, as will be described in detail later herein.

Figure 24:
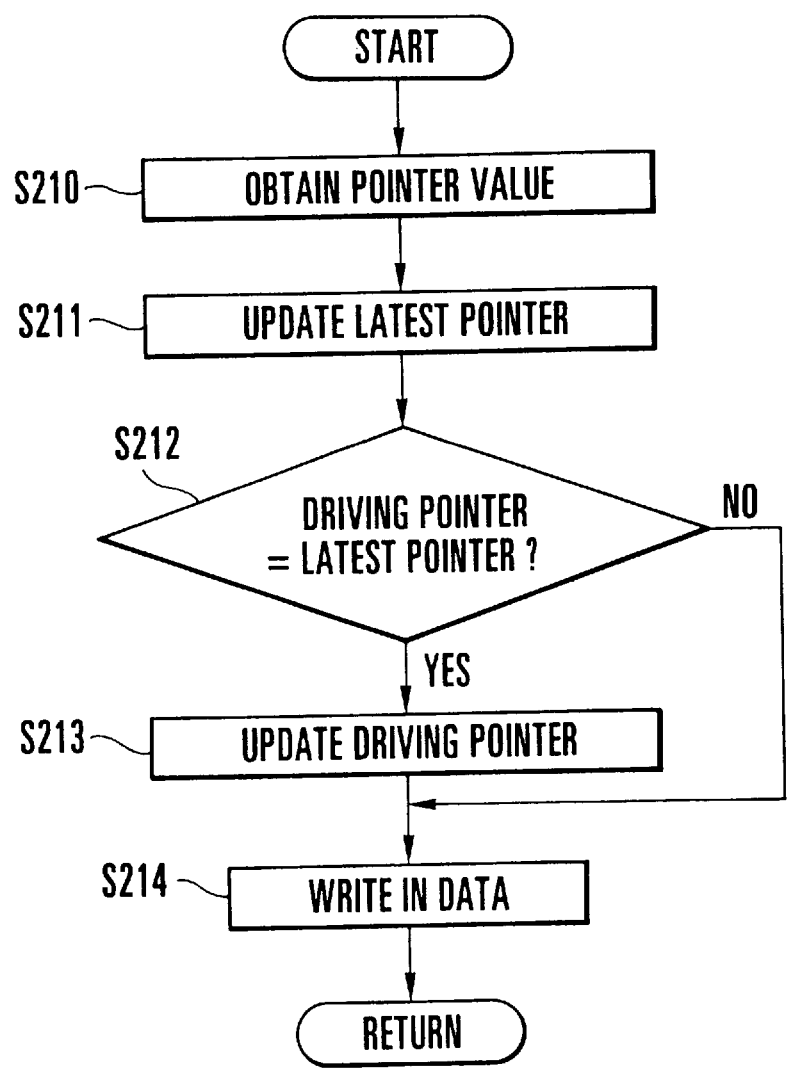
FIG. 24 is a flow chart further showing the action of the control device of the third embodiment.

At the step S109, the data obtained by the step S108 and the data obtained by the step S105 relative to the rotating direction of the manual operation member 105 are stored in the ring buffer as additional data. This routine is arranged to be a subroutine, which begins at a step S210 as shown in FIG. 24. The data to be processed by the subroutine of FIG. 24 is data of one byte (8 bits). The most significant bit of the data is arranged to indicate the rotating direction of the manual operation member 105 and the remaining 7 bits to indicate the rotating speed of the manual operation member 105. The data is capable of showing the speed values of plus and minus 127 steps. In actuality, speeds of four steps are used by this embodiment. The subroutine of FIG. 24 will be described in detail later herein. After the data is added to the contents of the ring buffer, the flow of control shifts to a step S115.

At the step S110, the value of the "k-flag" is checked to find if the motor 108 is currently in process of driving. If so, the flow comes to the step S111. If not, the flow comes back to the step S105.

At the step S111, the value of the timer 115 is obtained. At the step S112, the value of the timer 115 is checked to find if it exceeds a predetermined value. If so, the operation on the manual operation member 105 is considered to have been suspended and the flow comes to the step S113. If not, the operation is considered to be still in process and the flow comes to the step S115.

At the step 113, an energizing stopping instruction is sent to the driving circuit 110 by outputting energizing stopping data to the I/O port 111. Upon receipt of the instruction, the driving circuit 110 stops applying a current to the motor 108 to turn the motor 108 off. At the step S114, the work areas are initialized to show that the motor 108 is in repose. A reset signal is sent to the counter 109, and the motor rotation detecting counter 109 is reset. The work areas to be initialized includes the "pointer-now", the "pointer-new", the "k-flag" and the "counter". After the initialization, the flow comes to the step S105.

Steps S115 to S122 are provided for executing stopping processes at both ends of a movable range of the moving lens group 102. At the step S115, information from the position detecting means 103 is obtained through the I/O port 112. With the information on the position of the moving lens group 102 thus obtained, information on the focal length of the lens system 101 can be obtained.

At the step S116, the content of the "k-flag" is checked to find if a driving action is in process. If so, the flow comes to the step S117. If not, the flow comes to the step S120. At the step S117, if the information obtained by the step S115 indicates that the position of the moving lens group 102 is at one end of its movable range and that it is still being driven to move toward the same end, the flow comes to the step S118. If not, the flow of control shifts to a step S123.

At the step S118, an energizing stopping instruction is sent to the driving circuit 110 by outputting energizing stopping data to the I/O port 111. Upon receipt of this instruction, the driving circuit 110 stops applying a current to the motor 108 to turn off the motor 108. At the step 119, the work areas are initialized to show that the motor 108 is in repose. Further, a reset signal is sent to the counter 109. The counter 109 for detecting the rotation of the motor 108 is reset. The work areas to be initialized include the "pointer-now", the "pointer-new", the "k-flag" and the "counter". After they are initialized, the flow of control shifts to the step S105.

At the step S120, the value of the "pointer-now" and that of the "pointer-new" are compared with each other to find if there is any data in the ring buffer. If so, the flow comes to the step S121. If not, the flow of control shifts to the step S123.

At the step S121, next driving instruction data which is indicated by an address "pointer-now+1" is read out from the ring buffer. At this time, the value of the pointer is not updated. At the step S122, if the information on the position of the moving lens group 102 obtained by the step S115 indicates one end of its movable range and the next driving instruction data obtained by the step S121 indicates driving toward the same end, the flow comes to the step S119. If not, the flow of control shifts to the step S123.

At the step S123, the value of the "k-flag" is checked to find if the motor 108 is in process of driving. If so, the flow comes to a step S124. If not, the flow of control shifts to a step S146.

At the step S124, the value of the "pointer-now" and that of the "pointer-new" are compared with each other to find if any data is stored in the ring buffer. If so, the flow comes to a step S125. If not, the flow of control shifts to a step S128. At the step S125, the current driving direction of the motor is obtained from the value of the "direction". The latest rotating direction of the manual operation member 105 is obtained from the data of the ring buffer which is shown by the "pointer-now". If the two directions coincide with each other, the flow comes to a step S126. If they are opposite directions, the flow of control shifts to a step S135.

At the step S126, the value of the "pointer-now" and that of the "pointer-new" are compared with each other to obtain a number of data stored in the ring buffer. At a step S127, a check is made to find if the number of data obtained by the step S126 is three or more than three, the flow comes to a step S132. If not, the flow comes to a step S128. At the step S128, a "counter" value which is a target driving counter value is obtained. At a step S129, a "motor-counter" value of the counter 109 is obtained from the I/O port 113. At a step S130, the "counter" value obtained by the steps S128 and S129 and the "motor-counter" value are compared with each other. If the "counter" value is larger than the "motor-counter" value, the flow of control shifts to a step S143. If the "counter" value is equal to or less than the "motor-counter" value, the flow comes to a step S131. The process of this step represents a feature of this embodiment.

This embodiment is arranged such that, even if some data is stored in the ring buffer, the driving target counter value is not updated if previous input data has not been completely processed as yet. The flow is allowed to proceed to the step S131 on the condition that the previous input data has been completely processed, whereas, under the conventional control, the driving target counter value is updated irrespective of completion or noncompletion of process on the previous input data.

At the step S131, the value of the "pointer-now" and that of the "pointer-new" are compared with each other to find if any data is stored in the ring buffer. If so, the flow of control comes to a step S137. If not, the flow comes to the step S135.

At the step S132, three data are taken out in the reverse order from the "pointer-new", i.e., three latest data are taken out from the ring buffer. A total of them are obtained as data 3 in the following manner: data 3=(pointer-new)+(pointer-new-1)+(pointer-new-2) In computing the above, when the value of the pointer comes to exceed the leading address of the ring buffer, the size of the ring buffer is added to the address and the data is taken out from the last address. Further, in the formula shown above, inside of parentheses indicates data of the addresses shown by the values of the pointer.

At a step S133, limit data is set, according to the operation ring rotating direction obtained from the latest data of the ring buffer, at "1" if it is normal rotation or at "2" if it is reverse rotation. The value set by this step is assumed to be a limit. At a step S134, a check is made to find if the data 3 is equal to or less than the limit. If so the flow of control shifts to a step S150. If not, the flow comes to a step S128.

At a step S135, an energizing stopping instruction is sent to the driving circuit 110 by outputting energizing stopping data to the I/O port 111. Upon receipt of the instruction, the driving circuit 110 stops applying a current to the motor 108 to turn off the motor 108. At a step S136, the work areas are initialized to show that the motor 108 is in repose. Further, a reset signal is sent to the counter 109. The counter 109 for detecting the rotation of the motor 108 is reset. The work areas to be initialized include the "pointer-now", the "pointer-new", the "k-flag" and the "counter". After they are initialized, the flow of control shifts to the step S105.

At the step S137, data shown as the "pointer-now" is obtained from the ring buffer and the value of the "pointer-now" is updated. The data taken out is assumed to be RD. At a step S138, the data RD obtained by the step S137 is converted into a driving amount RT for driving the motor 108. This routine is arranged to be a subroutine, which beings at a step S220 as shown in FIG. 25.

Figure 25:
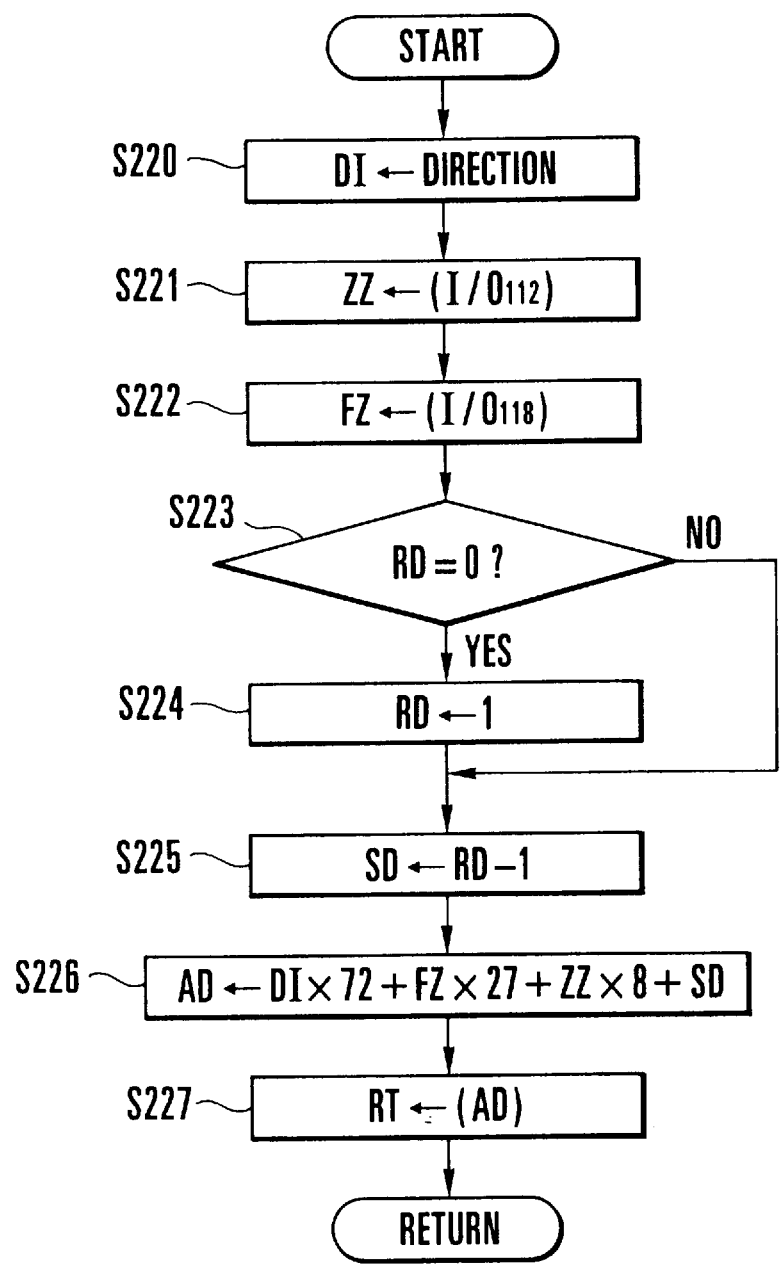
FIG. 25 is a flow chart further showing the action of the control device of the third embodiment.
Figure 26:
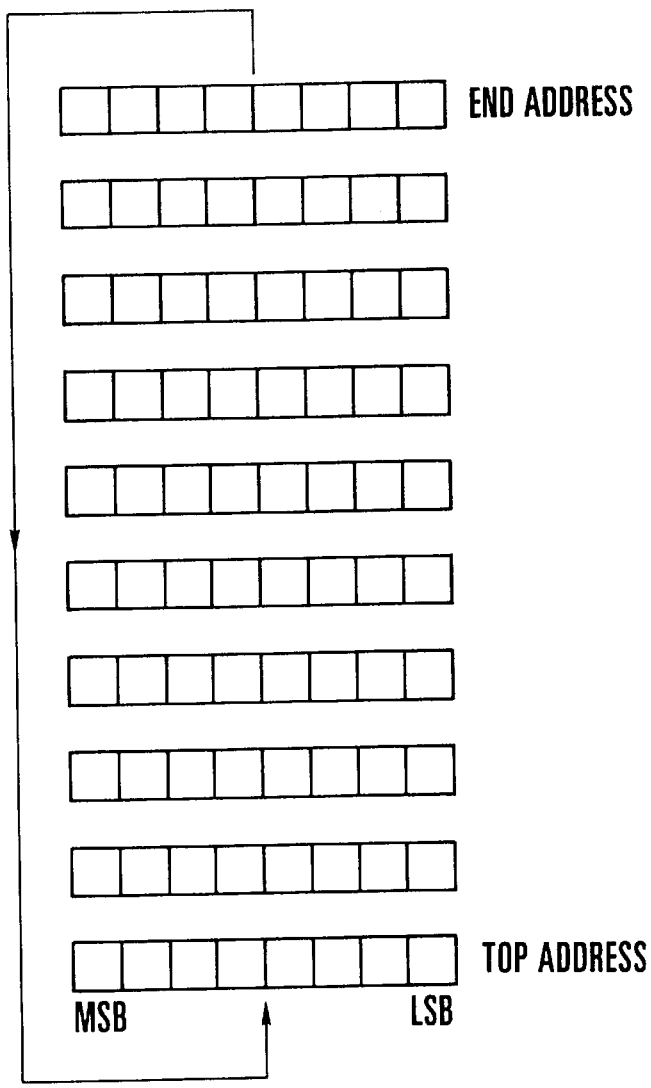
FIG. 26 shows the arrangement of a ring buffer.

The subroutine shown in FIG. 25 is executed as follows: the data RD of the ring buffer is used as input data. The lens position (zoom position) obtained by the lens position detecting means, the focusing lens position and the driving direction (direction) are used as parameters for conversion. Further, the motor driving amount RT is sent back as an output parameter.

The process of this step represents a feature of the third embodiment. The feature lies in that, unlike the control by the first embodiment, the driving amount is not decided on the basis of the zoom position, the focus position and the driving direction obtained at the time of input of the data of the operating speed of the manual operation ring (member) but is decided at the time of actual use. That is to say, the third embodiment is arranged as follows: the operating speed data of the manual operation ring (or member) is first inputted to the ring buffer. After that, at the time of actual driving, the input data is subjected one by one to a conversion process which is carried out by using a conversion coefficient obtained at that time. The conversion coefficient to be used in converting the operating speed of the manual operation ring into the driving amount by which the lens system is to be actually driven thus can be decided at the time when the operating speed data is to be actually used.

Unlike the conventional control, the driving control of the third embodiment is not performed by processing individual data inputs as a whole but is performed by individually handling them as independent data when each of them is actually used. The subroutine of FIG. 25 will be described in detail later.

At a step S139, the driving amount RT obtained by the step S138 is added to the "counter". At a step S140, the value of the "motor-counter" value of the counter 109 is obtained through the I/O port 113. At a step S141, the "counter" value obtained by the step S139 is compared with the "motor-counter" value obtained by the step S140. If the "counter" value is larger than the "motor-counter" value, the flow comes to a step S143. If the "counter" value is less than or equal to the "moter-counter" value, the flow comes to a step S142.

At the step S142, a check is made to find if there is any unused data in the ring buffer. If so, the flow comes back to the step S137. If it is found that all data have already been used, the flow of control shifts to the step S135.

Steps S143 to S145 are provided for deciding the driving speed for driving the motor 108. At the step S143, data stored in the ring buffer is converted into a driving amount on the basis of information on the current lens position. A sum of the value of this driving amount and the value of ("counter" value-"motor-counter" value) is obtained to obtain the number of remaining driving pulses.

At the step S144, a duty ratio to be applied to the motor 108 is decided on the basis of the number of remaining driving pulses obtained by the step S143. At the step S145, the duty ratio decided by the step S144 and the value of the work area "direction" are supplied to the driving circuit 110 through the I/O port 111.

The motor 108 is then driven at the duty ratio in the direction indicated by the work area "direction". After the above-stated instruction is given to the driving circuit 110, the flow shifts to the step S105.

At a step S146, the value of the "pointer-now" is updated. Data is taken out from the ring buffer according to the address obtained after the updating. At a step S147, the data obtained by the step S146 is converted into a driving amount for driving the motor 108. This routine is arranged to be a subroutine, which begins from a step S220 as shown in FIG. 25. The subroutine shown in FIG. 25 is arranged to use, as four conversion parameters, the data of the ring buffer, the lens position obtained by the lens position detecting means, the position of the focusing lens and the driving direction and to send back a driving amount of the motor 108 as an output parameter.

At a step S148, the driving amount obtained by the step S147 is added to the work area "counter". The operating direction of the manual operation member 105 is detected from the data obtained by the step S146. The data thus obtained is stored as the driving direction of the motor 108 in the work area "direction". At a step S149, the value of the "k-flag" is changed to "1" which indicates that a driving action is in process. After that, the flow of control shifts to the step S143.

Steps S150 to S158 execute processes for a mode of carrying out a shift to one zooming end at once.

At the step S150, data for driving the motor 108 at a maximum speed in the operating direction of the manual operation member 105 at the time of a shift from one mode to another is set. The direction of the maximum speed driving is stored at the work area "direction".

At a step S151, data for driving the motor 108 at the maximum speed in the direction indicated by the "direction" is given to the driving circuit 110 through the I/O port 111. The motor 108 is thus driven at the maximum speed in the direction indicated by the work area "direction". At a step S152, information from the position detecting means 103 is obtained via the I/O port 112. At a step S153, the information obtained by the step S152 is checked to find if the target end position has been reached. If so, the flow comes to the step S157. If not, the flow comes to the step S154. At the step S154, information from the encoder 106 is taken in through the I/O port 107 to detect the state of the manual operation member 105. At the step S155, information taken in by the step S154 is checked for any new data. If no new data is obtained, the flow comes back to the step S152. If new data is obtained, i.e., if pulses has been newly generated by the rotation of the manual operation member 105, the flow proceeds to the step S156. At the step S156, the data obtained by the step S155 is checked to find if the data indicates the same direction as the data of the work area "direction". If so, the flow of control comes back to the step S152. If not, the flow shifts to the step S157. In other words, the flow comes to the step S157 if the manual operation member 105 is moved in the reverse direction while the lens group 102 is in process of moving toward the target position. At the step S157, an energizing stopping instruction is sent to the driving circuit 110 by outputting energizing stopping data to the I/O port 111. Upon receipt of the instruction, the driving circuit 110 ceases to apply a current to the motor 108. The motor 108 is turned off. At the step S158, the work areas are initialized to show that the motor 108 is now in repose. Further, a reset signal is sent to the counter 109 to reset the counter 109 which is provided for detecting the rotation of the motor 108.

After the initialization, the flow of control shifts to the step S105. The structure of the main program will be apparent from the description given above. The details of subroutines are next described as follows:

(a) Data Conversion Subroutine (FIG. 23)

This subroutine functions to have a timer value obtained as an input parameter and return the data for storing it in the ring buffer as an output parameter. The subroutine is described with reference to FIG. 23 as follows: when the subroutine is called, the flow of control shifts to a step S201.

Figure 27:
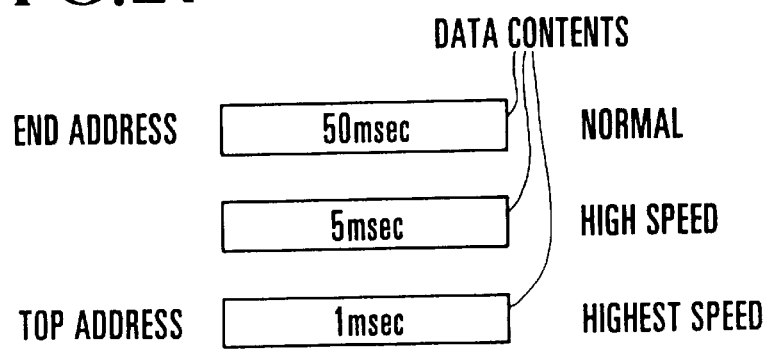
FIG. 27 shows the arrangement of a timer table.

At the step S201, the pointer is set at the top address of the table of timer values shown in FIG. 27. At a step S202, the data indicated by the pointer is obtained. At a step S203, the data obtained by the step S202 is compared with the timer value obtained as the input parameter. If the former is less than or equal to the latter, the flow comes to a step S206. If not, the flow comes to a step S204.

At the step S204, the pointer is shifted to next data to update it by incrementing the pointer value by one. At a step S205, a check is made to find if the pointer value exceeds the end address of the table (no table data). If not, the flow comes to a step S206. If the pointer value is found not exceeding the end address of the table (there is table data), the flow of control comes back to the step S202. Since the number of data set as shown in FIG. 27 is three, this loop of processes is executed up to three times. The number of data set of course may be any other number so long as it is a plural number. At the step S206, an output parameter is obtained by subtracting the top address of the timer table from the value of the pointer. Through this step, the output parameter of the subroutine becomes one of values "0" to "3". The flow then comes back to the part of the main routine where this subroutine has been called.

In the case of this embodiment, the driving amount sensitivity for one of the normal and reverse directions is changed for the other direction by changing one driving amount conversion table over to another. However, about the same advantageous effect can be of course attained by changing this arrangement to have the threshold values of stored data (shown in FIG. 27) for both the normal and reverse directions. In a case where the threshold values are arranged for both the normal and reverse directions, the control operation can be carried out adequately by arranging only one driving amount conversion table as shown in FIG. 5 or 14.

(b) Data Adding Subroutine (FIG. 24)

This subroutine functions to add an input parameter to the ring buffer. In the event of overflow of the ring buffer, the oldest data is rescinded. The ring buffer is thus allowed to store the history of up to ten pulse intervals of pulses inputted from the manual operation member 105. The actions of this subroutine is described with reference to the flow chart of FIG. 24.

When the subroutine is called, the flow of control shifts to a step S210. At the step S210, the value of the "pointer-new" is obtained. At a step S211, the latest pointer of data is advanced by incrementing the value of the "pointer-new" by one to update it. At this time, if the value of the "pointer-new" exceeds the end address of the ring buffer which is as shown in FIG. 26, the value of the "pointer-new" is set at its initial address. This process causes the pointer of data to indicate one after another the ten storage areas of FIG. 26 in a ring-like manner.

At a step S212, the value of the "pointer-new" is compared with that of the "pointer-now". If they are found to be equal, the flow comes to a step S213. If not, the flow of control shifts to a step S214.

At the step S213, the driving-in-process pointer of data is advanced by incrementing the value of the "pointer-now" by one to update it. At that time, if the value of the "pointer-now" exceeds the end address of the ring buffer shown in FIG. 26, the value of the "pointer-now" is set at its initial address. By this process, the oldest of unprocessed input data is rescinded.

At the step S214, the input interval data of the manual operation member 105 which is the input parameter is written in at the address indicated as the "pointer-new". The history of up to ten pulse intervals of the pulses inputted from the manual operation member 105 is stored through this subroutine. After the step S214, the flow comes back to the part of the main routine where this subroutine is called.

(c) Driving Amount Converting Subroutine (FIG. 25)

This subroutine functions to convert the interval data (speed data) of the manual operation member 105 buffered at the ring buffer into the actual driving amount of the motor by using a conversion coefficient obtained on the basis of the state of the lens system and that of the driving system obtained at the point of time when this subroutine is called. In this subroutine, the data RD of the ring buffer is used as an input parameter. Further, within the subroutine, information on the lens system and the driving system, including the lens position detected by the lens position detecting means, the focusing lens position and the driving direction (the data of the work area "direction"), is obtained. Data obtained from the above-stated data referring to the table is returned as the driving amount RT of the motor 108. The actions of the subroutine are described with reference to the flow chart of FIG. 25 as follows:

When the subroutine is called, the flow of control shifts to a step S220. In the case of this embodiment, a table referring method is used in converting the parameter. The actual conversion is performed by a computing operation on table addresses. The reference table is composed of the data for the constant angle-of-view varying rate mode shown in FIGS. 14 and 5. Each data consists of 8 bits (1 byte). A total of 144 data are stored for normal and reverse rotations. It is of course also possible to carry out the conversion by some other suitable method, such as a pure computing method or a table-referring plus computing method (including interpolating computation) or the like.

At the step S220, the current driving direction is obtained. Assuming that the current direction is DI, the value of the DI is either "0" if it is normal rotation or "1" if it is reverse rotation. The work area "direction" is set at the DI. At a step S221, the signal of the position detecting means 103 which shows the zooming position (information on focal length) is taken in as zoom position data ZZ from the I/O port 112. With the zoom position data ZZ taken in, it becomes possible to obtain zoom position information which is necessary in converting the input from the manual operation member 105 into driving data at the actual time of driving. This zoom position data is one of values "0" to "7", which correspond to focal length ranges from 28 to 34.5 mm (0), from 34.5 to 41 mm (1), —and from 73.5 to 80 (7). The zoom position data ZZ is input data from the I/O port 112.

At a step S222, the signal of the position detecting means 117 which indicates the position of the focusing lens group 116 is taken in as focus position data FZ through the I/O port 118. With the focus position data FZ thus obtained, information on the focus position which is necessary in converting the input from the manual operation member 105 into driving data can be obtained at the time of actual driving. The focus position data is one of values "0", "1" and "2", which correspond to the object distance ranges from a minimum object distance to 0.5 m (0), from 0.5 to 1.5 m (1) and from 1.5 to an infinity distance (2). The focus position data FZ is input data from the I/O port 118.

This embodiment is applied to the so-called classic zoom type. Therefore, an in-focus distance and a zoom position are determined according to the position of the focusing lens group and the zooming position. However, in a case where this invention is applied to a rear focus type zoom lens, as in the case of the second embodiment described in the foregoing, the position of the focusing lens group sometimes does not correspond to the in-focus distance. In such a case, a focus position can be computed by taking the position of the zooming lens into consideration. The table referring method of this embodiment is, therefore, of course applicable to such a case.

Next, reference is made to the driving table according to the state of each lens obtained when the subroutine is called, i.e., when the speed data inputted from the manual operation member 105 is to be actually used and also according to the input speed data (interval data) RD which is an input parameter. Further, since the interval data is one of the values "0" to "3", the interval data is correlated to the operating speed in the following manner: 0 and 1: the high speed 2: the normal speed. 3: the low speed The steps of the flow of control for these actions are as follows: at a step S223, a check is made to find if the interval data RD is at "0", because the high speed data is obtained in cases where the value of the interval data RD is either "0" or "1". If the value of the data RD is found to be at "0", the flow comes to a step S224. If not, the flow jumps to a step S225.

At the step S224, the interval data RD is set at "1". By this, the value of the interval data RD is forcibly set at "1". At the step S225, the value of data SD for offset address computation is set at a value RD-1. By this step, the data SD is set at "0" for the high speed, at "1" for the normal speed, and at "2" for the low speed. After that, an address computing operation is carried out for making reference to the table. At a step S226, the table address is computed from the data DI, FZ, ZZ and SD according to the following formula:

Address $AD = DI \times 72 + FZ \times 27 + ZZ \times 8 + SD$

In accordance with the formula shown above, an address which shows driving data is computed on the basis of the lens state, the driving state and the interval data. At a step S227, the end driving data RT is obtained from the address computed by the step S226. The data RT is set at the value of data (AD), which is data stored at the address indicated as AD.

By the step S227, a driving amount is set at RT as the output parameter of this subroutine. Through this subroutine, the interval data RD which is the input history of the stored operating speed of the manual operation part 105 is determined according to the lens state obtained at the time of actual use of the interval data RD. After the processes described above, the flow of control comes back to the part of the main routine at which this subroutine is called.

The power zoom control over the zoom lens of the embodiment is carried out by the main program and the subroutines described above. The advantageous effect attainable in accordance with the arrangement of the embodiment are as follows:

(i) Since the control is performed on the basis of the input speed history of the manual operation member and the state of the lens obtained at the time of actual use of the input data, the sensitivity curve of the manual operation member can be traced with fidelity.

(ii) An unintentional change of mode can be prevented since the change of mode according to the operating speed of the manual operation member is effected on the basis of an average of pulse intervals.

Each of the first to third embodiments of this invention is arranged to carry out control over the positions of lenses which vary according to zooming and focusing operations by using, in addition to the operating speed of the operation part, at least one of other parameters related to the amount of operation, the focal length and the object distance. Therefore, a disagreeable feeling of operation due to changes in the focal length and the object distance can be minimized.

For example, the program of varying the focal length in relation to the operating amount of the zooming operation part of the camera can be varied or the change in the focal length varying amount in relation to the operation part can be corrected by varying the driving amount according to the object distance. It is also possible to perform control over the value of focus sensitivity which varies with the focal length and the object distance according to a certain relationship.

The lens position, therefore, can be controlled according to a shooting condition as desired by the photographer. According to this invention, therefore, an optical apparatus can be arranged to have good operability with a less amount of disagreeable feeling under the influence of changes taking place in the area of shooting.

In accordance with this invention, information on lens position control to be performed according to zooming and focusing operations can be stored beforehand within the lens in the form of tables. Therefore, more latitude is allowable to design work since a restriction due to the cam groove shape of the cam ring (for forming it in a rectilinear shape, for example) can be removed.

Further, in accordance with this invention, a driving control device for driving and controlling an object of driving according to the operating speed of a manual operation member which gives a pulse signal according to the speed of a manual operation thereon is arranged to include: storage means for individually and serially storing data relative to the pulse intervals of the pulse signal from the manual operation member, reading means for serially reading out the data from the storage means, conversion means for converting the data read out by the reading means into a driving parameter for driving the object of driving, timing control means for controlling the readout timing of the reading means, driving means for driving the object of driving, control means for controlling the driving means, and supply means arranged to take out data from the reading means at the timing obtained from the timing control means and to supply the parameter obtained by converting the data to the control means. The control means controls the object of driving by controlling the driving means on the basis of the parameter received from the supply means. A time difference between the timing of input from the manual operation member and the timing at which the motor is actually driven can be eliminated by this arrangement. The arrangement gives the following advantages:

(i) Since the control is performed on the basis of the history of input speed of the manual operation member and the state of the object of driving obtained at the time of actual use of the input data, the sensitivity curve of the manual operation member can be traced with fidelity.

(ii) The buffering process on the input data from the manual operation member before the use of it ensure a stable operation.

(iii) A plurality of information instructions can be dealt with by a single manual operation member.

Figure 22:
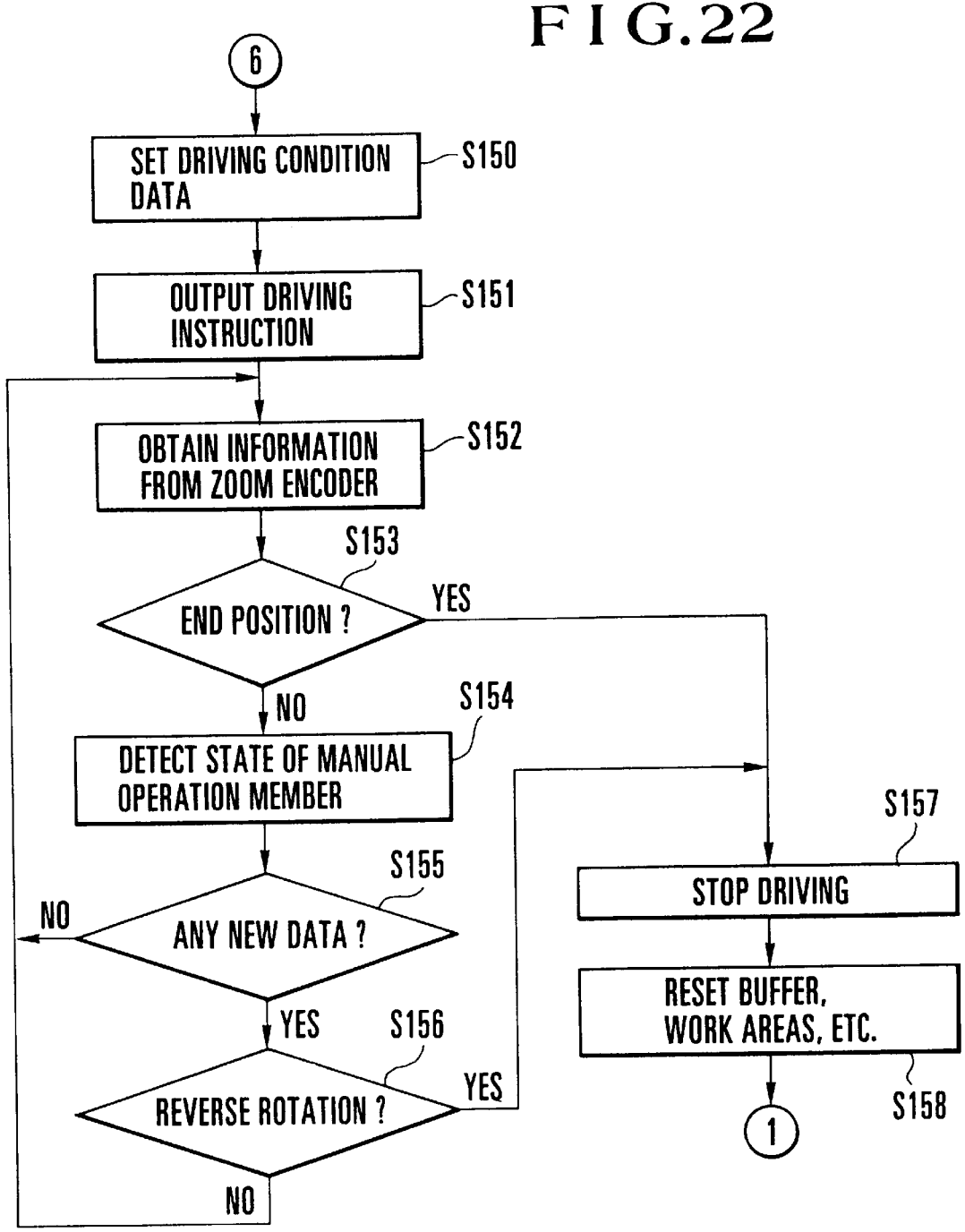
FIG. 22 is a flow chart further showing the action of the control device of the third embodiment.

A fourth embodiment of this invention is described as follows:

In the fourth embodiment, the arrangement of the block diagram of FIG. 13 and processes of the flow chart of FIG. 22 showing the third embodiment are modified and some control processes are added to the processes of the third embodiment. With the exception of these points, the fourth embodiment is arranged in exactly the same manner as the third embodiment. Therefore, all the parts of the fourth embodiment that are similar to those of the third embodiment are omitted from the following description.

Figure 30:
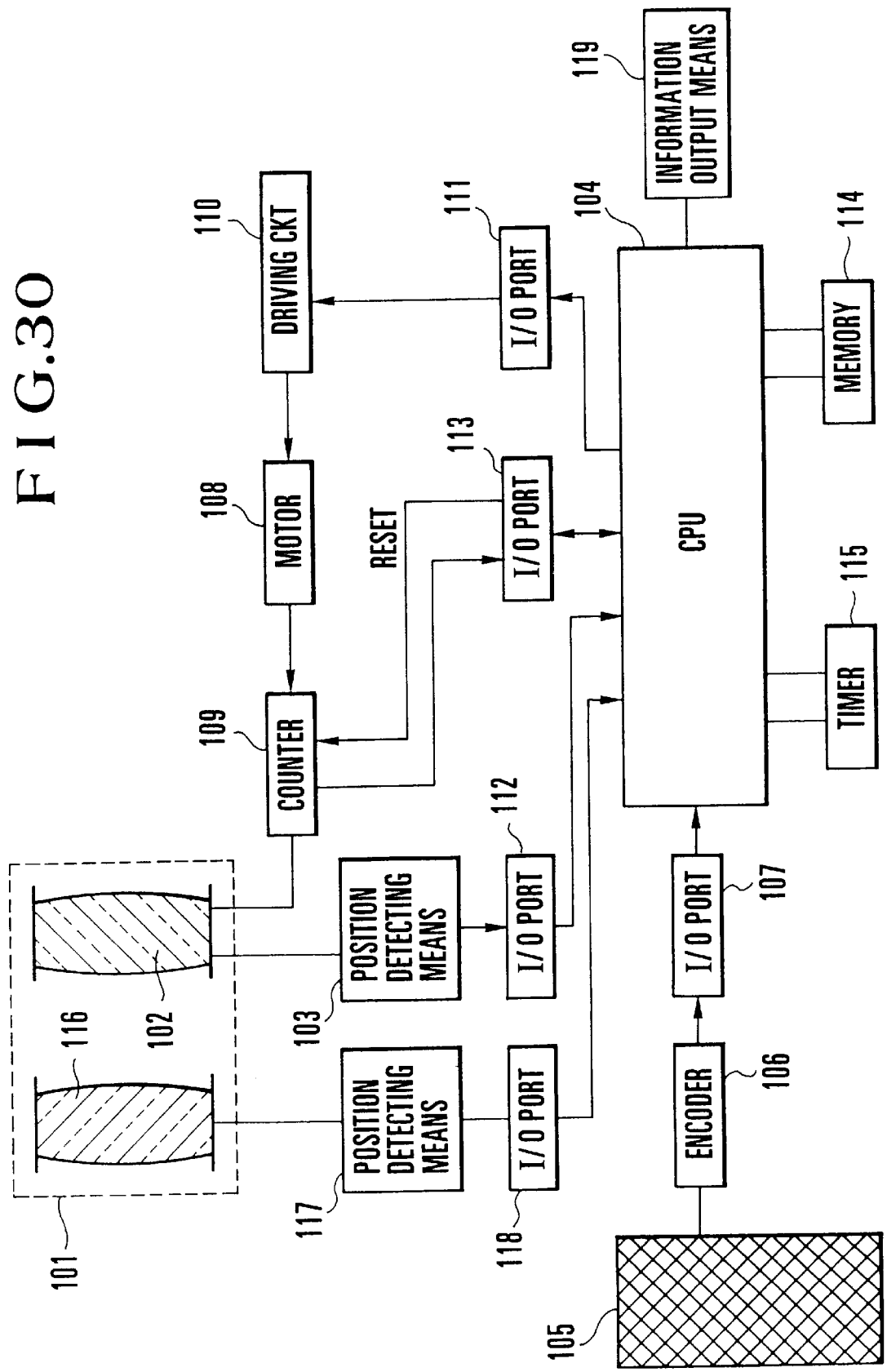
FIG. 30 is a block diagram showing the arrangement of a signal processing device of a fourth embodiment of this invention.

FIG. 30 is a block diagram showing a minor difference from what is shown in FIG. 13. Information output means 119 is added to FIG. 13. The information output means 119 is a sound emitting body arranged to inform the operator of mode change-over from a first mode to a second mode and the end of operation in the second mode. Further, the flow chart of FIG. 22 showing the third embodiment is replaced with a flow chart shown in FIG. 31.

Figure 31:
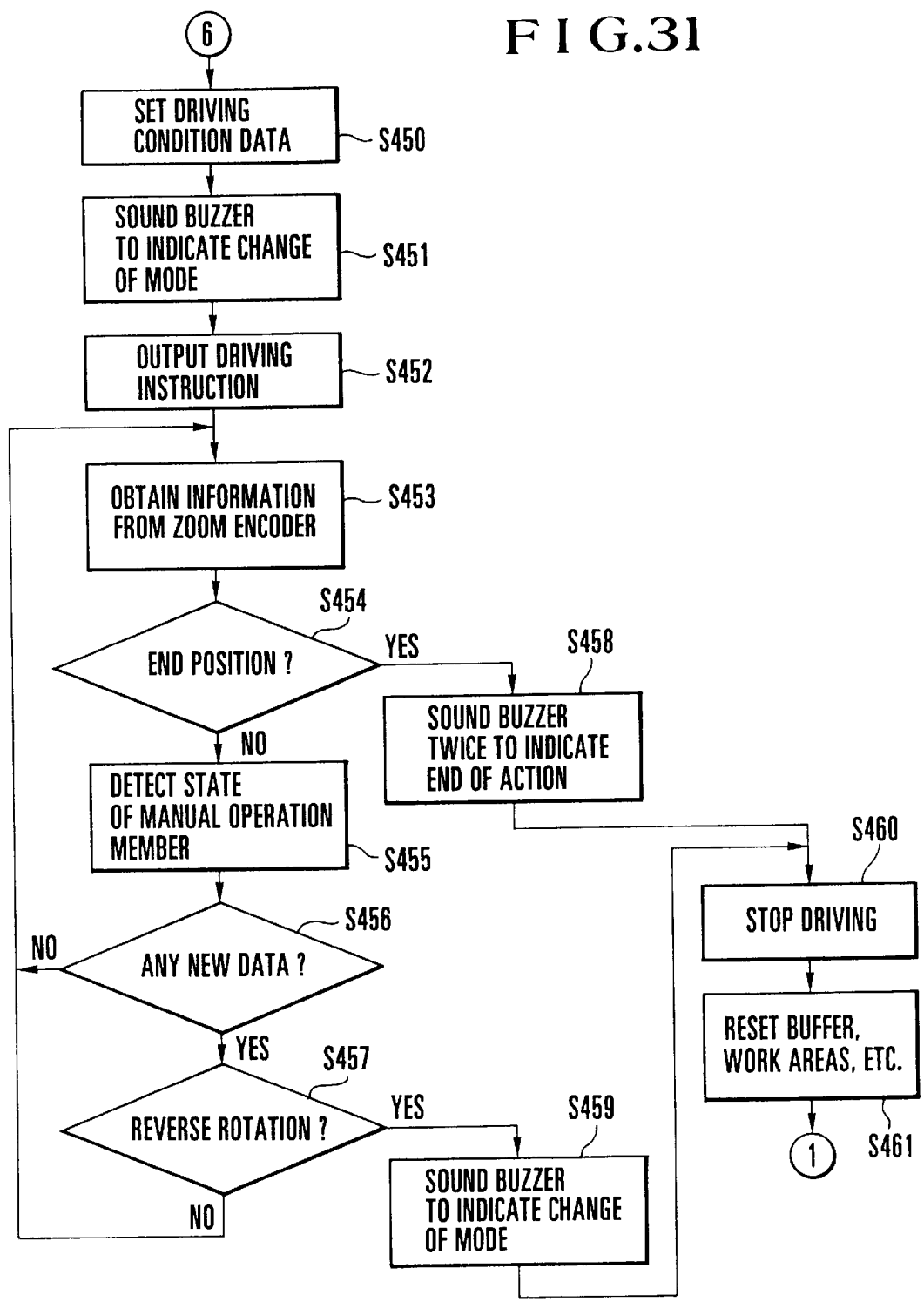
FIG. 31 is a flow chart of a control program for the signal processing device of the fourth embodiment.

Referring to FIG. 31, steps S450 to S461 are arranged to shift the lens position at once to a zoom end position in the second mode.

At the step S450, data is set for driving the motor 108 at a maximum speed in the operating direction of the manual operation member 105 obtained at the time of mode change-over. This direction is stored at the work area "direction". At the step S451, the sound emitting body 119 is caused to emit a buzzer sound to inform the operator that the mode changing action is performed. At the step S452, the data for driving the motor 108 at the maximum speed in the direction indicated by the work area "direction" is given to the driving circuit 110 through the I/O port 111. As a result, the motor 108 is driven at the maximum speed in the direction shown at the "direction".

At the step S453, information of the position detecting means 103 is obtained through the I/O port 112. At the step S454, the information obtained by the step S453 is checked to find if the target end position has been reached. If so, the flow of control comes to the step S458. If not, the flow comes to the step S455.

At the step S455, information from the encoder 106 is taken in through the I/O port 107. The state of the manual operation member 105 thus can be detected. At the step S456, the information taken in by the step S455 is checked for any new data. If new data is found to have been obtained, the flow of control comes to the step S457. If not, the flow comes to the step S453. In other words, the flow proceeds to the step S457 if the manual operation member 105 has further rotated to generate new pulses.

At the step S457, the data obtained by the step S456 is checked to find if the data indicates the same direction as the work area "direction". If the data is found to be indicating the opposite direction, the flow of control comes to the step S459. In other words, if the manual operation member 105 is moved in the reverse direction while the lens group 102 is moving toward its target position, the flow of control shifts to the step S459. This action corresponds to shifting means.

At the step S458, the sound emitting body 119 (information output means) is caused to emit a buzzer sound twice to inform the operator of the end of the action in the second mode. After that, the flow comes to the step S460. At the step S459, the sound emitting body 119 is caused to emit the buzzer sound to inform the operator that the mode changing action has been performed.

At the step S460, energizing stopping data is outputted to the I/O port 111 to send it to the driving circuit 110. Upon receipt of the energizing stopping data, the driving circuit 110 stops applying a current to the motor 108 to turn it off. At the step S461, the work areas are initialized to show that the motor 108 is in repose. Further, a reset signal is sent to reset the counter 109 which includes an encoder. The work areas to be initialized by this step include the "pointer-now", the "pointer-new", the "k-flag" and the "counter". After initialization, the flow shifts to the step S105.

As described above, the action in the second mode is performed independent of the first mode. In order to come out of the second mode either the action must be finished or the manual operation member 105 must be reversely rotated.

Figure 32:
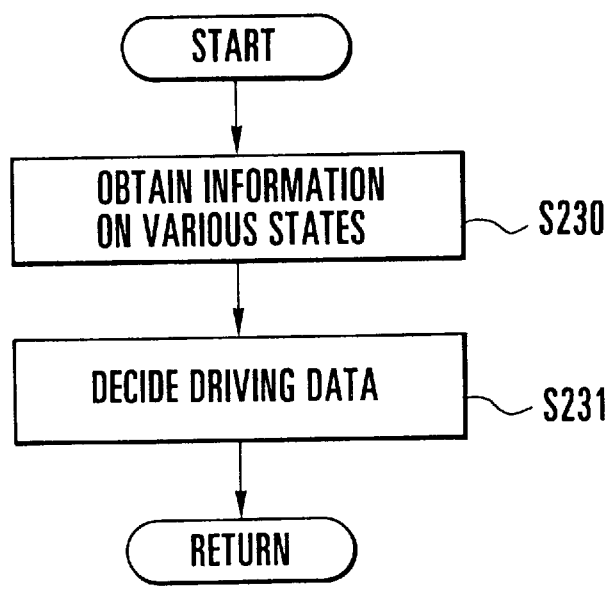
FIG. 32 is a flow chart showing a driving amount converting subroutine of the control program for the signal processing device of the fourth embodiment.

Next, additional subroutine is described below with reference to a flow chart shown in FIG. 32:

When the subroutine is called, the flow shifts to a step S230. At the step S230, the signal of the position detecting means 103 indicating a zoom position is taken in from the I/O port 112. The signal of the other position detecting means 117 indicating the position of the focusing lens group is taken in from the I/O port 118. The current driving direction is detected from the value of the work area "direction". At a step S231, a driving amount is decided according to the various states of lens taken in by the step S230 and the interval data which is an input parameter by referring to the table of driving amounts which is as shown in FIG. 14. Further, since the interval data consists of values "0" to "3", the interval data is correlated with the operating speeds as follows:

0 and 1: the high speed

2: the normal speed

3: the low speed.

In this instance, an applicable value is obtained either from the table shown in FIG. 5, if the value of the "direction" indicates the normal rotation, or from the table shown in FIG. 14 if the value of the "direction" indicates the reverse rotation.

Further, the values of the constant angle-of-view varying rate mode shown in the tables of FIGS. 5 and 14 are used in the case of this embodiment. The driving amount thus obtained becomes the output parameter of the sub-routine described above. The input history data stored is decided on the basis of the state of the lens obtained at the time of actual use of the data through this subroutine. After the processes described above, the flow of control comes back to the part of the main routine where the subroutine is called.

In the case of the fourth embodiment described, the signal processing device for processing a pulse signal obtained according to the operation amount of the manual operation member and the operating direction thereof is arranged to have a first mode in which the pulse signal is used as an object of processing when the operating speed of the manual operation member obtained from the pulse signal is less than a predetermined speed and a second mode in which processes are performed without using the pulse signal when the operating speed of the manual operation member is not less than the predetermined speed. The device is further arranged to include holding means which serves to retain the second mode even when the operating speed of the manual operation member comes to be less than the predetermined speed after the shift of processes from the first mode to the second mode. This arrangement gives the following advantages:

When the operating speed of the manual operation member is slow, the device facilitates fine adjustment, because the system can be controlled by using the pulse signal obtained according to the amount of operation.

The mode shifts to the second mode when the manual operation member is quickly moved and the second mode is retained thereafter. The manual operation member, therefore, does not have to be continuously operated.

A plurality of modes can be changed from one mode over to another by means of a single operation member. This not only improves the operability but also permits reduction in size and cost of the device.

With the device provided with shifting means which is arranged such that, if the operating direction of the manual operation member obtained by the pulse signal while the device is operating in the second mode becomes opposite to the direction obtained at the time of change to the second mode, the shifting means stops the action in the second mode and shifts it to the first mode. That arrangement further gives the following advantages:

The second mode can be brought to a stop by reversely moving the manual operation member. Therefore, the operation can be changed at once as desired.

The provision of the shifting means obviates the necessity of providing an additional operation member for bringing the mode to a stop. Therefore, it also permits reduction in size and cost of the device.

Further, the arrangement of generating a mode change-over signal for actuating information output means to inform the operator of the change in the mode, when the mode of operation shifts between the first and second modes, enables the operator to know the change of the mode and thus to have an excellent feeling of operation.

Further, with the lens member of the optical system arranged to be driven on the basis of the above-stated pulse signal in the first mode and to be driven to a predetermined position in the second mode, the excellent advantageous effect can be attained in driving the lens of the optical system.

Further, with an action completion signal generated to actuate the information output means for informing the operator of the end of an action in the second mode by emitting a sound or making a display or the like, the operator can be enabled to know the end of the action and thus to have an excellent feeling of operation.

Further, the arrangement of detecting an operating speed which requires a shift to the second mode after a predetermined time or by averaging a predetermined number of pulses, stabilizes the mode change-over and prevents any unintentional mode change-over.

What is claimed is:

1. A driving device, comprising:

a movable object;

driving means for moving the movable object;

a manual operation member;

pulse generating means for generating a plurality of pulses successively according to an operation of the manual operation member with pulse intervals varying depending on the operation speed of the manual operation member;

data forming means for forming a plurality of data on the basis of the plurality of pulses successively according to the pulse intervals;

storage means for storing successively the plurality of data; and means for reading out the plurality of data successively from the storage means and determining a drive parameter for each of the read out data corresponding to the speed for moving the movable object by the driving means by using the value of the data, the timing for reading out subsequent data being set after completion of the movement of the movable object on the basis of a prior data value.

2. A driving device according to claim 1, further comprising detecting means for detecting a position of the movable object, wherein the determining means determines the drive parameter on the basis of the position of the movable object at the time of reading out the data and the value of the data.

3. A driving device according to claim 2, further comprising direction detection means for detecting an operation direction of the movable object, wherein the determining means determines the drive parameter on the basis of the operation direction and the position of the movable object at the time of reading out the data and the value of the data.

4. A lens driving device, comprising:
 a lens;
 driving means for moving the lens;
 a manual operation ring;
 pulse generating means for generating successively a plurality of pulses in response to a rotation of the manual operation ring with intervals of the plurality of pulses varying depending on the rotation speed of the manual operation ring;
 data formation means for successively forming a plurality of data on the basis of the plurality of pulses and according to the pulse intervals;
 storage means for storing successively the plurality of data; and
 determination means for reading out the plurality of data successively from the storage means and determining a drive parameter for each of the read out data corresponding to the speed of moving the lens by the driving means by using the value of the data, the timing for a reading out subsequent data being set after completion of the movement of the lens on the basis of a preceding data value.

5. A lens driving device according to claim 4, further comprising detection means for detecting a position of the lens, wherein the determination means determines the drive parameter on the basis of the position of the lens at the time of reading out the data and the value of the data.

6. A lens driving device according to claim 5, further comprising focal length detecting means for detecting a focal length of an image forming optical system including the lens, wherein the determination means determines the drive parameter on the basis of the focal length and the position of the lens at the time of reading out the data and the value of the data.

7. A lens driving device according to claim 6, further comprising direction detection means for detecting a rotation direction of the manual operation ring, wherein the determination means determines the drive parameter on the basis of the rotation direction, the focal length, the position of the lens at the time of reading out the data and the value of the data.

8. A lens driving device according to claim 5, further comprising direction detection means for detecting a rotation direction of the manual operation ring, wherein the determination means determines the drive parameter on the basis of the rotation direction, the position of the lens at the time of reading out the data and the value of the data.

9. A zoom lens in which a variator lens unit is moved by a driving device, said driving device comprising:
 driving means for moving the variator lens unit;
 a manual operation ring;
 pulse generating means for generating successively a plurality of pulses in response to a rotation of the manual operation ring with an interval of the plurality of pulses varying depending on the rotation speed of the manual operation ring;
 data formation means for successively forming a plurality of data each of which corresponds to the pulse interval on the basis of the plurality of pulses;
 storage means for storing successively the plurality of data; and
 determination means for reading out the plurality of data successively from the storage means and determining a drive parameter for each of the read out data, corresponding to the speed of moving the variator lens unit by the driving means by using the data value, the timing for a reading out subsequent data being set after completion of the movement of the variator lens unit on the basis of a preceding data value.

10. A zoom lens according to claim 9, further comprising detection means for detecting a position of the variator lens unit, wherein the determination means determines the drive parameter on the basis of the position of the variator lens unit at the time of reading out the data and the data value.

11. A zoom lens according to claim 10, further comprising focal length detecting means for detecting a focal length of an image forming optical system including the variator lens unit, wherein the determination means determines the drive parameter on the basis of the focal length and the position of the variator lens unit at the time of reading out the data and the data value.

12. A zoom lens according to claim 11, further comprising direction detection means for detecting a rotation direction of the manual operation ring, wherein the determination means determines the drive parameter on the basis of the rotation direction, the focal length, the position of the variator lens unit at the time of reading out the data and the data value.

13. A zoom lens according to claim 10, further comprising direction detection means for detecting a rotation direction of the manual operation ring, wherein the determination means determines the drive parameter on the basis of the rotation direction, the position of the variator lens unit at the time of reading out the data and the data value.

14. A zoom lens in which a focus lens unit is moved by a driving device, said driving device comprising:
 driving means for moving the focus lens unit;
 a manual operation ring;
 pulse generating means for generating successively a plurality of pulses in response to a rotation of the manual operation ring with interval of the plurality of pulses varying depending on the rotation speed of the manual operation ring;
 data formation means for successively forming a plurality of data each of which corresponds to the pulse interval on the basis of the plurality of pulses;
 storage means for storing successively the plurality of data; and
 determination means for reading out the plurality of data successively from the storage means and determining a drive parameter for each of the read out data, corresponding to the speed of moving the focus lens unit by the driving means by using the data value, the timing for a reading out subsequent data being set after completion of the movement of the focus lens unit on the basis of a preceding data value.

15. A zoom lens according to claim 14, further comprising detection means for detecting a position of the focus lens unit, wherein the determination means determines the drive parameter on the basis of the position of the focus lens unit at the time of reading out the data and the data value.

16. A zoom lens according to claim 15, further comprising focal length detecting means for detecting a focal length of an image forming optical system including the focus lens unit, wherein the determination means determines the drive parameter on the basis of the focal length and the position of the focus lens unit at the time of reading out the data and the data value.

17. A zoom lens according to claim 16, further comprising direction detection means for detecting a rotation direction of the manual operation ring, wherein the determination means determines the drive parameter on the basis of the rotation direction, the focal length, the position of the focus lens unit at the time of reading out the data and the data value.

18. A zoom lens according to claim 15, further comprising direction detection means for detecting a rotation direction of the manual operation ring, wherein the determination means determines the drive parameter on the basis of the rotation direction, the position of the focus lens unit at the time of reading out the data and the data value.

19. An optical apparatus in which a lens unit is moved by a driving device, said driving device comprising:

driving means for moving the lens unit;

a manual operation ring;

pulse generating means for generating successively a plurality of pulses in response to a rotation of the manual operation ring with interval of the plurality of pulses varying depending on the rotation speed of the manual operation ring;

data formation means for successively forming a plurality of data each of which corresponds to the pulse interval on the basis of the plurality of pulses;

storage means for storing successively the plurality of data; and determination means for reading out the plurality of data successively from the storage means and determining a drive parameter for each of the read out data, corresponding to the speed of moving the lens unit by the driving means by using the data value, the timing for a reading out subsequent data being set after completion of the movement of the lens unit on the basis of a preceding data value.

20. An optical apparatus according to claim 19, further comprising detection means for detecting a position of the lens unit, wherein the determination means determines the drive parameter on the basis of the position of the lens unit at the time of reading out the data and the data value.

21. An optical apparatus according to claim 20, further comprising focal length detecting means for detecting a focal length of an image forming optical system including the lens unit, wherein the determination means determines the drive parameter on the basis of the focal length and the position of the lens unit at the time of reading out the data and the data value.

22. An optical apparatus according to claim 21, further comprising direction detection means for detecting a rotation direction of the manual operation ring, wherein the determination means determines the drive parameter on the basis of the rotation direction, the focal length, the position of the lens unit at the time of reading out the data and the data value.

23. An optical apparatus according to claim 20, further comprising direction detection means for detecting a rotation direction of the manual operation ring, wherein the determination means determines the drive parameter on the basis of the rotation direction, the position of the lens unit at the time of reading out the data and the data value.

* * * * *

UNITED STATES PATENT AND TRADEMARK OFFICE
CERTIFICATE OF CORRECTION

PATENT NO. : 5,832,318
DATED : November 3, 1998
INVENTOR(S) : Shiegeki Sato, et al.

It is certified that error appears in the above-identified patent and that said Letters Patent is hereby corrected as shown below:

```
Column 24, line 19, after "normal speed". and after "low speed" insert
--,--.
```

Signed and Sealed this

Twenty-second Day of June, 1999

Attest:

Q. TODD DICKINSON

*Attesting Officer*     *Acting Commissioner of Patents and Trademarks*